US009467455B2

(12) United States Patent
Seiver et al.

(10) Patent No.: US 9,467,455 B2
(45) Date of Patent: *Oct. 11, 2016

(54) SYSTEMS FOR NETWORK RISK ASSESSMENT INCLUDING PROCESSING OF USER ACCESS RIGHTS ASSOCIATED WITH A NETWORK OF DEVICES

(71) Applicant: PALANTIR TECHNOLOGIES INC., Palo Alto, CA (US)

(72) Inventors: Miles Seiver, Los Altos Hills, CA (US); Charles Rosenblum, Palo Alto, CA (US)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/731,312

(22) Filed: Jun. 4, 2015

(65) Prior Publication Data

US 2016/0191532 A1 Jun. 30, 2016

Related U.S. Application Data

(63) Continuation of application No. 14/585,043, filed on Dec. 29, 2014, now Pat. No. 9,100,430.

(51) Int. Cl.
*H04L 29/06* (2006.01)
*H04L 12/24* (2006.01)

(52) U.S. Cl.
CPC .............. *H04L 63/101* (2013.01); *H04L 41/12* (2013.01); *H04L 63/1433* (2013.01)

(58) Field of Classification Search
CPC .. H04L 63/101; H04L 41/12; H04L 63/1433
USPC .......................................................... 726/4
See application file for complete search history.

(56) References Cited

U.S. PATENT DOCUMENTS 5,951,644 A * 9/1999 Creemer ................ H04L 12/58
370/229
5,978,475 A 11/1999 Schneier et al.
(Continued)

FOREIGN PATENT DOCUMENTS

CN 101729531 6/2010
CN 103281301 9/2013
(Continued)

OTHER PUBLICATIONS

Baker et al., "The Development of a Common Enumeration of Vulnerabilities and Exposures," Presented at the Second International Workshop on Recent Advances in Intrusion Detection, Sep. 7-9, 1999, pp. 35.

(Continued)

*Primary Examiner* — Michael S McNally
(74) *Attorney, Agent, or Firm* — Knobbe Martens Olson & Bear LLP

(57) ABSTRACT

Methods, systems, and apparatus, including computer programs encoded on computer storage media, for network risk assessment. One of the methods includes obtaining information describing network traffic between a plurality of network devices within a network. A network topology of the network is determined based on the information describing network traffic, with the network topology including nodes connected by an edge to one or more other nodes, and with each node being associated with one or more network devices. Indications of user access rights of users are associated to respective nodes included in the network topology. User interface data associated with the network topology is generated.

17 Claims, 12 Drawing Sheets

(56) References Cited

U.S. PATENT DOCUMENTS

| | | | |
|---|---|---|---|
| 6,499,034 B1* | 12/2002 | Mackinlay | G06F 17/3089 |
| | | | 707/999.102 |
| 6,535,227 B1 | 3/2003 | Fox et al. | |
| 6,725,240 B1 | 4/2004 | Asad et al. | |
| 6,807,569 B1 | 10/2004 | Bhimani et al. | |
| 6,826,698 B1 | 11/2004 | Minkin et al. | |
| 6,895,383 B2 | 5/2005 | Heinrich | |
| 7,013,395 B1 | 3/2006 | Swiler et al. | |
| 7,017,046 B2 | 3/2006 | Doyle et al. | |
| 7,069,586 B1 | 6/2006 | Winneg et al. | |
| 7,120,120 B2 | 10/2006 | Guerin et al. | |
| 7,159,023 B2* | 1/2007 | Tufts | H04L 29/06 |
| | | | 709/223 |
| 7,193,968 B1 | 3/2007 | Kapoor et al. | |
| 7,225,468 B2 | 5/2007 | Waisman et al. | |
| 7,450,524 B2 | 11/2008 | Hennessey et al. | |
| 7,472,421 B2 | 12/2008 | Cummins | |
| 7,555,778 B2 | 6/2009 | Noel et al. | |
| 7,596,285 B2 | 9/2009 | Brown et al. | |
| 7,663,626 B2* | 2/2010 | Rexroad | H04L 12/2602 |
| | | | 345/440 |
| 7,770,032 B2 | 8/2010 | Nesta et al. | |
| 7,801,871 B2 | 9/2010 | Gosnell | |
| 7,855,978 B2* | 12/2010 | Beaudoin | G06Q 10/08 |
| | | | 345/440 |
| 7,864,707 B2 | 1/2011 | Dimitropoulos et al. | |
| 7,890,869 B1 | 2/2011 | Mayer et al. | |
| 7,904,962 B1 | 3/2011 | Jajodia et al. | |
| 7,962,495 B2 | 6/2011 | Jain et al. | |
| 7,971,244 B1 | 6/2011 | Kajekar et al. | |
| 8,099,760 B2 | 1/2012 | Cohen et al. | |
| 8,132,260 B1 | 3/2012 | Mayer et al. | |
| 8,181,253 B1 | 5/2012 | Zaitsev et al. | |
| 8,190,893 B2 | 5/2012 | Benson et al. | |
| 8,196,184 B2 | 6/2012 | Amirov et al. | |
| 8,209,760 B1 | 6/2012 | Hardman | |
| 8,239,668 B1 | 8/2012 | Chen et al. | |
| 8,301,904 B1 | 10/2012 | Gryaznov | |
| 8,307,444 B1 | 11/2012 | Mayer et al. | |
| 8,312,546 B2 | 11/2012 | Alme | |
| 8,321,944 B1 | 11/2012 | Mayer et al. | |
| 8,402,546 B2 | 3/2013 | Greenshpon et al. | |
| 8,490,196 B2 | 7/2013 | Lucangeli Obes et al. | |
| 8,494,955 B2 | 7/2013 | Quarterman et al. | |
| 8,601,587 B1 | 12/2013 | Powell et al. | |
| 8,646,080 B2 | 2/2014 | Williamson et al. | |
| 8,683,322 B1 | 3/2014 | Cooper | |
| 8,726,379 B1 | 5/2014 | Stiansen et al. | |
| 8,769,412 B2 | 7/2014 | Gill et al. | |
| 8,780,758 B2 | 7/2014 | Bukofser et al. | |
| 8,782,794 B2 | 7/2014 | Ramcharran | |
| 8,931,043 B2 | 1/2015 | Cooper et al. | |
| 9,009,827 B1 | 4/2015 | Albertson et al. | |
| 9,021,260 B1 | 4/2015 | Falk et al. | |
| 9,049,117 B1 | 6/2015 | Nucci et al. | |
| 9,100,428 B1 | 8/2015 | Visbal | |
| 9,100,430 B1 | 8/2015 | Seiver et al. | |
| 2002/0112157 A1 | 8/2002 | Doyle et al. | |
| 2002/0120558 A1 | 8/2002 | Reid | |
| 2004/0123139 A1 | 6/2004 | Aiello et al. | |
| 2004/0153418 A1 | 8/2004 | Hanweck | |
| 2004/0167793 A1 | 8/2004 | Masuoka et al. | |
| 2004/0250124 A1 | 12/2004 | Chesla et al. | |
| 2005/0096944 A1 | 5/2005 | Ryan | |
| 2005/0131828 A1 | 6/2005 | Gearhart | |
| 2005/0132225 A1 | 6/2005 | Gearhart | |
| 2005/0157662 A1 | 7/2005 | Bingham et al. | |
| 2005/0229256 A2 | 10/2005 | Banzhof | |
| 2005/0275638 A1 | 12/2005 | Kolmykov-Zotov et al. | |
| 2006/0031928 A1 | 2/2006 | Conley et al. | |
| 2006/0069912 A1 | 3/2006 | Zheng et al. | |
| 2006/0129672 A1 | 6/2006 | Mayer | |
| 2006/0212931 A1 | 9/2006 | Shull et al. | |
| 2006/0218637 A1 | 9/2006 | Thomas et al. | |
| 2006/0265747 A1 | 11/2006 | Judge | |
| 2007/0143851 A1 | 6/2007 | Nicodemus | |
| 2007/0294766 A1 | 12/2007 | Mir et al. | |
| 2008/0104407 A1 | 5/2008 | Horne et al. | |
| 2008/0201580 A1 | 8/2008 | Savitzky et al. | |
| 2008/0222706 A1 | 9/2008 | Renaud et al. | |
| 2008/0229422 A1 | 9/2008 | Hudis et al. | |
| 2009/0103442 A1 | 4/2009 | Douville | |
| 2009/0138938 A1 | 5/2009 | Harrison et al. | |
| 2009/0168648 A1 | 7/2009 | Labovitz et al. | |
| 2009/0228701 A1 | 9/2009 | Lin | |
| 2009/0327903 A1 | 12/2009 | Smith et al. | |
| 2009/0328222 A1 | 12/2009 | Helman et al. | |
| 2010/0077481 A1 | 3/2010 | Polyakov et al. | |
| 2010/0100963 A1 | 4/2010 | Mahaffey | |
| 2010/0235915 A1 | 9/2010 | Memon et al. | |
| 2010/0262688 A1 | 10/2010 | Hussain et al. | |
| 2010/0275263 A1 | 10/2010 | Bennett et al. | |
| 2010/0330801 A1 | 12/2010 | Rouh | |
| 2011/0060910 A1 | 3/2011 | Gornish et al. | |
| 2011/0202555 A1 | 8/2011 | Cordover et al. | |
| 2011/0219450 A1 | 9/2011 | McDougal et al. | |
| 2012/0023230 A1 | 1/2012 | Hosking et al. | |
| 2012/0079592 A1 | 3/2012 | Pandrangi | |
| 2012/0084866 A1 | 4/2012 | Stolfo | |
| 2012/0110633 A1 | 5/2012 | An et al. | |
| 2012/0110674 A1 | 5/2012 | Belani et al. | |
| 2012/0169593 A1 | 7/2012 | Mak et al. | |
| 2012/0218305 A1 | 8/2012 | Patterson et al. | |
| 2012/0254129 A1 | 10/2012 | Wheeler et al. | |
| 2012/0266245 A1 | 10/2012 | McDougal et al. | |
| 2012/0284791 A1 | 11/2012 | Miller et al. | |
| 2012/0304244 A1 | 11/2012 | Xie et al. | |
| 2012/0323829 A1 | 12/2012 | Stokes et al. | |
| 2012/0330801 A1 | 12/2012 | McDougal et al. | |
| 2013/0019306 A1 | 1/2013 | Lagar-Cavilla et al. | |
| 2013/0097709 A1 | 4/2013 | Basavapatna et al. | |
| 2013/0139268 A1 | 5/2013 | An et al. | |
| 2013/0239217 A1 | 9/2013 | Kindler et al. | |
| 2014/0059683 A1 | 2/2014 | Ashley | |
| 2014/0082196 A1 | 3/2014 | Harrison et al. | |
| 2014/0123279 A1 | 5/2014 | Bishop et al. | |
| 2014/0130160 A1 | 5/2014 | Golovanov | |
| 2014/0143009 A1 | 5/2014 | Brice et al. | |
| 2014/0173090 A1 | 6/2014 | Davis | |
| 2014/0173712 A1 | 6/2014 | Ferdinand | |
| 2014/0173738 A1 | 6/2014 | Condry et al. | |
| 2014/0188895 A1 | 7/2014 | Wang et al. | |
| 2014/0222745 A1 | 8/2014 | Deng et al. | |
| 2014/0229422 A1 | 8/2014 | Jain et al. | |
| 2014/0282854 A1 | 9/2014 | Clark et al. | |
| 2014/0282855 A1 | 9/2014 | Clark et al. | |
| 2014/0366132 A1 | 12/2014 | Stiansen et al. | |
| 2015/0039565 A1 | 2/2015 | Lucas | |
| 2015/0128274 A1 | 5/2015 | Giokas | |
| 2015/0188715 A1 | 7/2015 | Castellucci et al. | |
| 2015/0229664 A1 | 8/2015 | Hawthorn et al. | |
| 2015/0248563 A1 | 9/2015 | Alfarano et al. | |
| 2015/0261847 A1 | 9/2015 | Ducott et al. | |
| 2015/0326601 A1 | 11/2015 | Grondin et al. | |
| 2016/0004864 A1 | 1/2016 | Falk et al. | |
| 2016/0028759 A1 | 1/2016 | Visbal | |

FOREIGN PATENT DOCUMENTS

| | | |
|---|---|---|
| EP | 1962222 | 8/2008 |
| EP | 2892197 | 7/2015 |
| EP | 2897051 | 7/2015 |
| EP | 2963578 | 1/2016 |
| EP | 2985974 | 2/2016 |
| NL | 2011642 | 8/2015 |
| WO | WO 2005/010685 | 2/2005 |
| WO | WO 2007/061404 | 5/2007 |
| WO | WO 2010/042979 | 4/2010 |

(56) References Cited

FOREIGN PATENT DOCUMENTS

OTHER PUBLICATIONS

Crosby et al., "Efficient Data Structures for Tamper-Evident Logging," Department of Computer Science, Rice University, 2009, pp. 17.
FireEye—Products and Solutions Overview, http://www.fireeye.com/products-and-solutions Printed Jun. 30, 2014 in 3 pages.
FireEye, http://www.fireeye.com Printed Jun. 30, 2014 in 2 pages.
Glaab et al., "EnrichNet: Network-Based Gene Set Enrichment Analysis," Bioinformatics 28.18 (2012): pp. i451-i457.
Huang et al., "Systematic and Integrative Analysis of Large Gene Lists Using DAVID Bioinformatics Resources", Nature Protocols, 2009, vol. 4, No. 1, pp. 44-57.
Hur et al., "SciMiner: web-based literature mining tool for target identification and functional enrichment analysis," Bioinformatics 25.6 (2009): pp. 838-840.
Lee et al., "A Data Mining and CIDF Based Approach for Detecting Novel and Distributed Intrusions," Lecture Notes in Computer Science, vol. 1907 Nov. 11, 2000, pp. 49-65.
Ma et al., "A New Approach to Secure Logging," ACM Transactions on Storage, vol. 5, No. 1, Article 2, Published Mar. 2009, 21 pages.
Notice of Allowance for U.S. Appl. No. 14/223,918 dated Jan. 6, 2016.
Notice of Allowance for U.S. Appl. No. 14/280,490 dated Nov. 26, 2014.
Notice of Allowance for U.S. Appl. No. 14/473,860 dated Jan. 5, 2015.
Notice of Allowance for U.S. Appl. No. 14/479,863 dated Mar. 31, 2015.
Official Communication for European Patent Application No. 14199180.2 dated Jun. 22, 2015.
Official Communication for European Patent Application No. 14199180.2 dated Aug. 31, 2015.
Official Communication for European Patent Application No. 15175106.2 dated Nov. 5, 2015.
Official Communication for U.S. Appl. No. 14/223,918 dated Jun. 8, 2015.
Official Communication for U.S. Appl. No. 14/280,490 dated Jul. 24, 2014.
Official Communication for U.S. Appl. No. 14/473,860 dated Nov. 4, 2014.
Official Communication for U.S. Appl. No. 14/479,863 dated Dec. 26, 2014.
Official Communication for U.S. Appl. No. 14/490,612 dated Aug. 18, 2015.
Official Communication for U.S. Appl. No. 14/490,612 dated Jan. 27, 2015.
Official Communication for U.S. Appl. No. 14/490,612 dated Mar. 31, 2015.
Official Communication for U.S. Appl. No. 14/823,935 dated Dec. 4, 2015.
Schneier et al., "Automatic Event Stream Notarization Using Digital Signatures," Security Protocols, International Workshop Apr. 1996 Proceedings, Springer-Veriag, 1997, pp. 155-169, https://schneier.com/paper-event-stream.pdf.
Schneier et al., "Cryptographic Support for Secure Logs on Untrusted Machines," The Seventh USENIX Security Symposium Proceedings, USENIX Press, Jan. 1998, pp. 53-62, https://www schneier.com/paper-secure-logs.pdf.
VirusTotal—About, http://www.virustotal.com/en/about/ Printed Jun. 30, 2014 in 8 pages.
Waters et al., "Building an Encrypted and Searchable Audit Log," Published Jan. 9, 2004, 11 pages, http://www.parc.com/content/attachments/building_encrypted_searchable_5059_parc.pdf.
Zheng et al., "GOEAST: a web-based software toolkit for Gene Ontology enrichment analysis," Nucleic acids research 36.suppl 2 (2008): pp. W385-W363.
Allgress, "Allgress Risk Analysis Module," http://www.allgress.com/en/products/risk-analysis-module/ as printed Jan. 6, 2015 in 3 pages.
Ammann et al., "Scalable, Graph-Based Network Vulnerability Analysis," CCS '02—Proceedings of the 9th ACM Conference on Computer and Communications Security, Nov. 18-22, 2002, pp. 218-224.
Böhme, "Cyber-Insurance Revisited," Presented at the Workshop on the Economics of Information Security Kennedy School of Government at Harvard University, Jun. 3, 2005, pp. 22.
Cashell et al., "The Economic Impact of Cyber-Attacks," CRS Report for Congress, Order Code RL32331, Apr. 1, 2004, pp. 45.
Dantu et al., "Risk Management Using Behavior Based Attack Graphs," Proceedings of the International Conference on Information Technology, Coding and Computing (ITCC '04), 2004, pp. 5.
EMC, "RSA Security Analytics," http://www.emc.com/security/security-analytics/security-analytics.htm, printed Jan. 6, 2015, pp. 2.
Eusegeld et al., "Dependability Metrics, Advanced Lectures," Lecture Notes in Computer Science, vol. 4909, 1998, pp. 304.
Firemon, http://www.firemon.com/, printed Jan. 6, 2015 in 2 pages.
Harmantzis et al., "Security Risk Analysis and Evaluation," 2004 IEEE International Conference on Communications, vol. 4, Jun. 20-24, 2004, pp. 1897-1901.
Homer et al., "A Sound and Practical Approach to Quantifying Security Risk in Enterprise Networks," Technical Report, Kansas State University, 2009, pp. 1-15.
Idika et al., "Extending Attack Graph-Based Security Metrics and Aggregating Their Application," IEEE Transactions on Dependable and Secure Computing, vol. 9, No. 1, Jan./Feb. 2012, pp. 75-85.
Ingols et al., "Practical Attack Graph Generation for Network Defense," MIT, Proceedings of the 22nd Annual Computer Security Applications Conference (ACSAC '06), 2006, pp. 10.
Jajodia et al., "Topological Analysis of Network Attack Vulnerability," Center for Secure Information Systems, George Mason University, Chapter 5, Springer, 2005, pp. 1-20.
Jajodia et al., "Topological Vulnerability Analysis: A Powerful New Approach for Network Attack Prevention, Detection, and Response," Center for Secure Information Systems, George Mason University, Cyber Situation Awareness, Advances in Information Security 46, Springer, 2010, pp. 1-20.
Jha et al., "Two Formal Analyses of Attack Graphs," CSFW '02 Proceedings of the 15th IEEE Workshop on Computer Security Foundations, 2002, pp. 15.
Johnson, "Managing Information Risk and the Economics of Security," Center for Digital Strategies, Springer, Dec. 2008, pp. 339.
Kotenko et al., "Attack Graph Based Evaluation of Network Security," Communications and Multimedia Security, 2006, vol. 4237, pp. 216-227.
Live Action, "NetFlow Visualization," http://liveaction.com/netflow-visualization/ printed on Jan. 6, 2015, pp. 5.
"Lumeta Integrates Products with Allgress" Insurance Networking News (Online), http://news.advisen.com/documents/AMX/20140325/01/201403250100SM_ONLINE_00034081_110.216.xml Mar. 25, 2014, pp. 1.
Lumeta, http://www.Lumeta.com, printed Jan. 6, 2015 in 2 pages.
Lumeta, "Alliance Partners," http://www.Lumeta.com/partners/alliancepartners.html, printed Jan. 6, 2015 in 5 pages.
Lumeta, "Lumeta IPsonar," http://www.Lumeta.com/product/ipsonar.html, printed Jan. 6, 2015 in 3 pages.
Lumeta, "Lumeta IPsonar: Network Discovery and Visual Analytics," available at https://web.archive.org/web/20140203135659/http://www.lumeta.com/public-content/Map-Interactivity/index.html, as accessed Feb. 3, 2014.
Lumeta, "Strategic Partners," http://www.lumeta.com/partners/strategicpartners.html, printed Jan. 6, 2015 in 2 pages.
Lumeta, "Technology Partners & Integrations," http://www.lumeta.com/partners/technicalpartners.html, printed Jan. 6, 2015 in 2 pages.
Lumeta, "Webinar: How to Assess True Risk within the Enterprise," available at http://web.archive.org/web/20150107184030/http://www.youtube.com/watch?v=TuB-ekUFYGo, as accessed Jan. 7, 2015.

(56) References Cited

OTHER PUBLICATIONS

Lumeta Ipsonar, "Active Network Discovery, Mapping & Leak Path Detection," Data Sheet, http://www.lumeta.com/pdfs/Lumeta_IPsonar_datasheet.pdf, 2014, pp. 4.

Madan et al., "A Method for Modeling and Quantifying the Security Attributes of Intrusion Tolerant Systems," Performance Evaluation, vol. 56, 2004, pp. 167-186.

Madan et al., "Security Modeling and Quantification of Intrusion Tolerant Systems," Fast Abstract ISSRE, Chillarge Press, 2002, pp. 2.

Madan et al., "Security Modeling and Quantification of Intrusion Tolerant Systems Using Attack-Response Graph," Journal of High Speed Networks, vol. 13, No. 4, 2004, pp. 14.

Mehta et al., "Ranking Attack Graphs," RAID '06 Proceedings of the 9th International Conference on Recent Advances in Intrusion Detection, 2006, pp. 127-144.

Nessus, http://www.tenable.com/products/nessus, printed Jan. 6, 2015 in 8 pages.

Nicol et al., "Model-Based Evaluation: From Dependability to Security," Dependable and Secure Computing, IEEE Transactions, vol. 1, No. 1, 2004, pp. 48-65.

Noel et al., "Measuring Security Risk of Networks Using Attack Graphs," International Journal of Next-Generation Computing, vol. 1, No. 1, Jul. 2010, pp. 135-147.

Phillips et al., "A Graph-Based System for Network-Vulnerability Analysis," NSPW '98 Proceedings of the 1998 Workshop on New Security Paradigms, New York, NY, 1998, pp. 71-79.

RedSeal, https://redseal.co/, printed on Jan. 5, 2015, 3 pages.

"RedSeal Continuous Monitoring Solutions Selected to Support Missions of U.S. Intelligence Community," https://www.iqt.org/redseal-continous-monitoring-solutions-selected-to-support-mission-of-u-s-intelligence-community/, In-Q-Tel, Jan. 10, 2011, 1 page.

Shackelford, "Should Your Firm Invest in Cyber Risk Insurance?" Business Horizons, 2012, vol. 55, pp. 349-356.

Sheyner et al., "Tools for Generating and Analyzing Attack Graphs," Formal Methods for Components and Objects, Second International Symposium, FMCO 2003, Leiden, The Netherlands, Nov. 4-7, 2003, Revised Lectures, 2004, pp. 344-371.

Singhal et al., "Security Risk Analysis of Enterprise Networks Using Probabilistic Attack Graphs," National Institute of Standards and Technology & U.S. Department of Commerce, NIST Interagency Report 7788, Aug. 2011, pp. 24.

SolarWinds, "Network Topology Mapper," http://www.solarwinds.com/network-topology-mapper.aspx, printed Jan. 6, 2015 in 6 pages.

Sommestad et al., "Cyber Security Risks Assessment with Bayesian Defense Graphs and Architectural Models," 42nd Hawaii International Conference on System Sciences, HICSS-42, Jan. 5-8, 2009, pp. 1-10.

Soo Hoo, Kevin J., "How Much is Enough? A Risk-Management Approach to Computer Security," Consortium for Research on Information Security and Policy, Jun. 2000, pp. 99.

Sturges et al., "Computer Attack: The Role of Modelling in Developing an Integrated Security Policy," Conference Proceedings, 14th International Conference of the System Dynamics Society, vol. 2, 1996, pp. 525-528.

Taylor et al., "Risk Analysis and Probabilistic Survivability Assessment (RAPSA): An Assessment Approach for Power Substation Hardening," in Proceedings of the 1st Workshop on Scientific Aspects of Cyber Terrorism, Nov. 2002, pp. 9.

"The Financial Impact of Cyber Risk: 50 Questions Every CFO Should Ask," American National Standards Institute/Internet Security Alliance, 2008, pp. 40.

Tufin, "Network Topology," http://www.tufin.com/products-solutions/products/network-topology/, printed Jan. 6, 2015 in 3 pages.

Varonis, http://www.varonis.com/, printed Jan. 6, 2015 in 3 pages.

Verendel, Vilhelm, "Quantified Security is a Weak Hypothesis: A Critical Survey of Results and Assumptions," NSPW '09, Sep. 8-11, 2009, Oxford, United Kingdom, pp. 37-49.

Wang et al., "An Attack Graph-Based Probabilistic Security Metric," 22nd Annual IFIP WG 11.3 Working Conference on Data and Applications Security, Jul. 13-16, 2008, pp. 16.

Wang et al., "Exploring Attack Graph for Cost-Benefit Security Hardening: A Probabilistic Approach," Computers & Security, vol. 32, 2013, pp. 158-169.

Wang et al., "Generation and Analysis of Attack Graphs," Procedia Engineering, vol. 29, 2012, pp. 4053-4057.

Wang et al., "Measuring the Overall Security of Network Configurations Using Attack Graphs," 21st Annual IFIP WG 11.3 Working Conference on Data and Applications Security, Jul. 8-11, 2007, pp. 16.

Wang et al., "Minimum-Cost Network Hardening Using Attack Graphs," Computer Communications, vol. 29, 2006, pp. 3812-3824.

Willis, Amy, "Business Insurance: First-Party Commercial Property Insurance and the Physical Damage Requirement in a Computer-Dominated World," Florida State University Law Review, vol. 37, No. 4, Summer 2010, pp. 21.

Yun et al., "A Probabilistic Computing Approach of Attack Graph-Based Nodes in Large-Scale Network," Procedia Environmental Sciences, vol. 10, 2011, pp. 3-8.

Yun et al., "An Attack Graph-Based Probabilistic Computing Approach of Network Security," Chinese Journal of Computers, vol. 33, No. 10, Oct. 2010, pp. 1987-1996.

Zhang et al., "An Effective Method to Generate Attack Graph," Proceedings of the Fourth International Conference on Machine Learning and Cybernetics, Guangzhou, Aug. 18-21, 2005, pp. 3926-3931.

Zhang et al., "Effective Network Vulnerability Assessment through Model Abstraction," DIMVA'11 Proceedings of the 8th International Conference on Detection of Intrusions and Malware, and Vulnerability Assessment, 2011, pp. 18.

Bhuyan et al., "Network Anomaly Detection: Methods, Systems and Tools" First Quarter 2014, IEEE, 34 pages.

Notice of Allowance for U.S. Appl. No. 14/033,076 dated Mar. 11, 2016.

Notice of Allowance for U.S. Appl. No. 14/473,860 dated Feb. 27, 2015.

Official Communication for European Patent Application No. 15180985.2 dated Jan. 15, 2016.

Official Communication for U.S. Appl. No. 14/033,076 dated Aug. 13, 2015.

Official Communication for U.S. Appl. No. 14/033,076 dated Nov. 6, 2015.

Official Communication for U.S. Appl. No. 14/731,312 dated Apr. 14, 2016.

Official Communication for U.S. Appl. No. 14/816,748 dated Apr. 1, 2016.

Official Communication for U.S. Appl. No. 14/923,712 dated Feb. 12, 2016.

Official Communication for U.S. Appl. No. 14/970,317 dated Mar. 21, 2016.

Official Communication for U.S. Appl. No. 14/982,699 dated Mar. 25, 2016.

Official Communication for European Patent Application No. 15202920.3 dated May 6, 2016.

\* cited by examiner

SYSTEMS FOR NETWORK RISK ASSESSMENT INCLUDING PROCESSING OF USER ACCESS RIGHTS ASSOCIATED WITH A NETWORK OF DEVICES

CROSS-REFERENCE TO RELATED APPLICATIONS

This application is a continuation of U.S. patent application Ser. No. 14/585,043, filed Dec. 29, 2014, and titled "SYSTEMS FOR NETWORK RISK ASSESSMENT INCLUDING PROCESSING OF USER ACCESS RIGHTS ASSOCIATED WITH A NETWORK OF DEVICES," which is hereby incorporated by reference in its entirety herein.

BACKGROUND

Networks are commonly utilized to connect an organization's, e.g., a company's, computer systems and electronically stored information. The organization can utilize components, e.g., routers, to receive connection requests from network devices, e.g., computer systems, and route the requests to appropriate devices that can handle the requests. Networks can include thousands or millions of network devices, with thousands or millions of user accounts permitted to access the network devices.

System administrators, e.g., people that set up and maintain networks, can attempt to separate their networks such that certain users/devices cannot access other parts of the network. To effect this separation, system administrators can utilize firewalls to block access, and utilize access control lists that identify user accounts expressly permitted to access particular network devices.

SUMMARY

In general, one innovative aspect of the subject matter described in this specification can be embodied in methods that include the actions of obtaining information describing network traffic between a plurality of network devices within a network; determining, based on the information describing network traffic, a network topology of the network, wherein the network topology comprises a plurality of nodes each connected by an edge to one or more of the plurality of nodes, and wherein each node is associated with one or more network devices; associating indications of user access rights of users to respective nodes included in the network topology; and generating user interface data associated with the network topology.

The foregoing and other embodiments can each optionally include one or more of the following features, alone or in combination. An indication of user access rights of a particular user to a particular node comprises one or more of: information indicating that the particular user is permitted access to a space which includes at least one network device associated with the particular node, information indicating that a user account associated with the particular user can provide information to, or receive information from, at least one network device associated with the particular node, or information indicating that the user account associated with the particular user is permitted to access, or has actually attempted to access, at least one network device associated with the particular node. The actions include obtaining access control lists associated with respective nodes, wherein each access control list identifies user accounts permitted to access one or more network devices associated with a node. The actions include obtaining access records associated with respective nodes, wherein each access record identifies actual access attempts by user accounts to one or more network devices associated with a node. Generating user interface data comprises generating a graph identifying the network topology. Each edge included in the network topology represents a communication path. The actions include receiving an identifier of a particular user; obtaining indications of user access rights of the particular user that are associated with respective nodes included in the network topology; and including information in the user interface data identifying the indications of user access rights.

Particular embodiments of the subject matter described in this specification can be implemented so as to realize one or more of the following advantages. A system can efficiently determine a network topology describing connections between network devices of a network, and user accounts permitted to access each network device. The system can then automatically determine weaknesses in the network, such as a previously unknown communication path between secure and insecure parts of the network, and quantify risks associated with the network, e.g., a loss to a company if a network device or user account were compromised. In this way, a company can obtain visual representations of its network, quickly view the level of access that each user account or network device has with respect to its network, and quantify costs associated with a compromised level of access.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
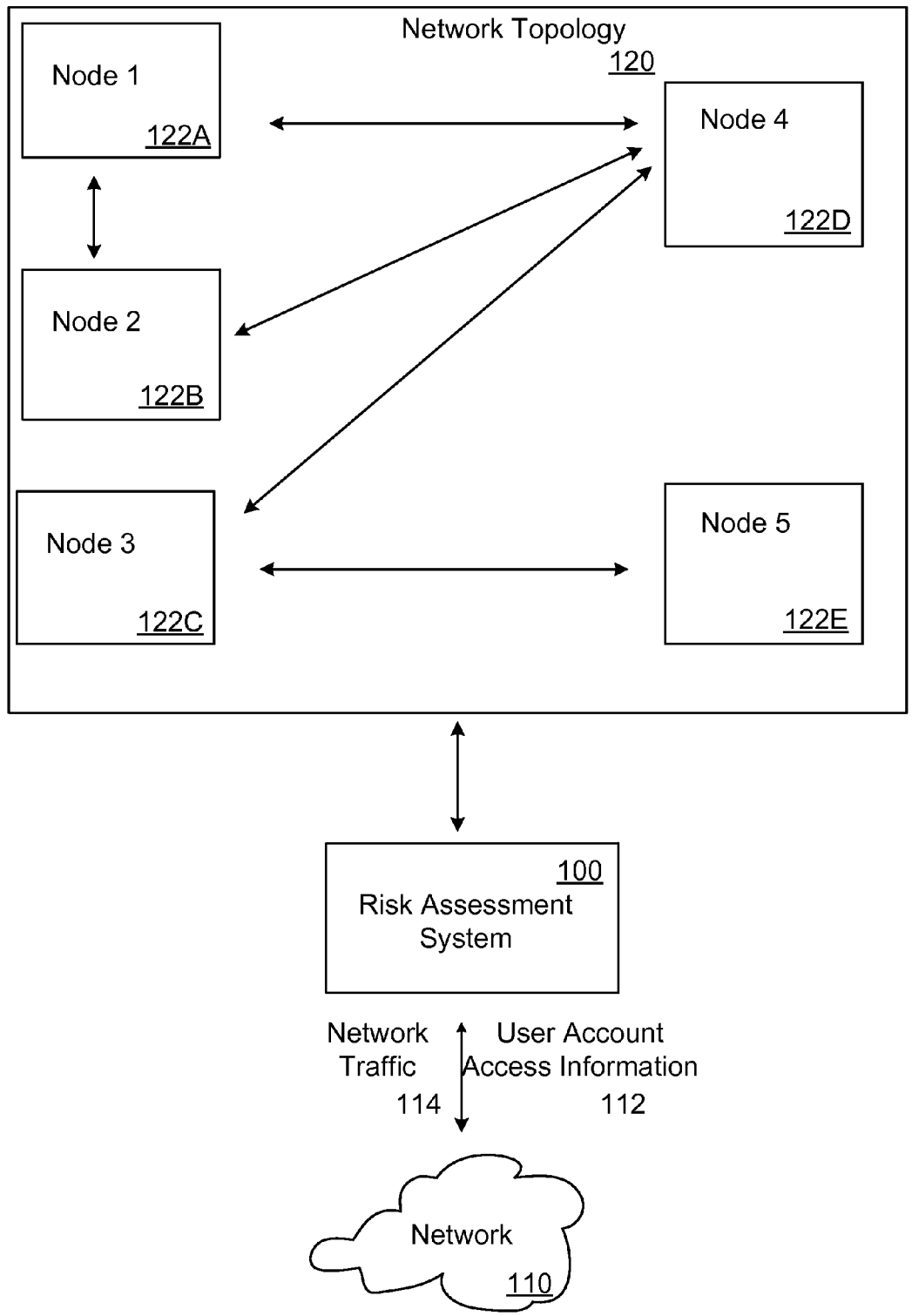
FIG. 1 illustrates a risk assessment system in communication with a network and an example of a determined network topology.

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Overview

This specification describes techniques to determine a network risk assessment. In particular, a system can determine a network topology, e.g., network devices and the connections between those network devices, of a network from network traffic between the network devices in the network. Network devices can include servers, laptops, desktops, storage device, routers, point of sale machines, and so on. The network traffic can include router logs, e.g., network flow data describing communications between network devices, firewall logs, e.g., data identifying network devices that are permitted to access particular other network devices, and proxy logs, e.g., data describing network devices that request or receive information through a proxy server. The system utilizes the network traffic to identify unique network devices, and connections from each unique network device to other unique network devices.

After determining a network topology, the system can obtain user account access information (or simply "access information") for each network device and/or for each user. "Access information," as used herein, refers generally to any information describing a level of access that a user account has within a network. For instance, access information can include information regarding a particular user account's access rights and/or actual accesses to nodes in a network topology. Such access information may be determined based on access privileges and/or access records. In general, "access privileges," as used herein, refers to any rules or information that is used to control what a user can access. Access privileges may be implemented using a list of rules that apply to a specific node (or other object, such as a file, folder, printer, etc.) that defines which user accounts or groups of user accounts have access to that object. An Access Control List (ACL) is one example of access privileges. "Access records," as used herein, generally refers to information indicating actual accesses by a network device, such as to other specific network devices and/or particular directories, files, etc., within the network. Examples of access records include those maintained by directory services, such as MICROSOFT ACTIVE DIRECTORY service. In some embodiments, access information includes information regarding user accounts associated with individuals that can physically touch a network device, e.g., people with access rights to a room containing the network device, which may be tracked using a physical keycard access log, for example.

The system can then provide information, e.g., to a system administrator, identifying the network topology and the level of access that each user account has with the network. The system can receive selections of user accounts, and provide a visual representation of the network devices that the user account can reach, e.g., ping or communicate with, or access, e.g., log into.

To identify risks, e.g., quantifiable risks, associated with network devices in the network, the system can determine a compromise value associated with each network device, e.g., the cost of data stored by the network device.

After determining compromise values for network devices, the system can receive an identification of a user account, or network device, and determine the total compromise value associated with the user account, or network device, being compromised, e.g., by an attacker. That is, the system can determine the total compromise value for a user account, or network device, from the respective compromise values of network devices that the user account, or network device, is permitted to access. The total compromise value therefore identifies the risk, e.g., to a company, incurred if a user account or network device gets compromised.

Additionally, the system can determine a compromise likelihood of a user account, or network device, being compromised. The compromise likelihood identifies a probability of the network device, or user account, being compromised, e.g., by an attacker.

The system can combine, e.g., multiply in a weighted relationship, the compromise likelihood with the respective total compromise value to determine a compromise risk value. The compromise risk value can be used to quickly determine how secure a network device, or user account, is, e.g., by an insurance company, or by individuals responsible for risk management at a company. In some embodiments, other inputs, e.g. a security questionnaire that is completed by a network administrator and/or individual network account holders, may be included in calculating a final network security evaluation, such as a network compromise risk value.

Example System Architecture and Network Topology

FIG. 1 illustrates a risk assessment system 100 in communication with a network 110 and an example of a determined network topology 120. The risk assessment system 100, e.g., a system of one or more computers, or software executing on a system of one or more computers (also referred to herein as "the system,") is configured to determine the network topology 120 from network traffic 114, e.g., router logs, firewall logs, proxy logs, router rules, of network devices included in a network 100. Example methods of determining a network topology 120 are described below, with reference to FIG. 4. The risk assessment system 100 can be used, or operated, by a system administrator, e.g., an IT staffer, Chief Technology Officer, technology consultant, manager, and so on. Thus, any reference to a "system administrator" or "administrator" herein should be interpreted to include any one or more of these individuals or groups of individuals, or any other entity that views and interacts with the various user interfaces disclosed herein.

The illustrated example of FIG. 1 includes five nodes, e.g., nodes 1-5 122A-E, with each node including one or more network devices. Each node was determined by the risk assessment system 100 to be included in the network 110. The risk assessment system 100 has also identified connections between each of the five nodes, e.g., node 3 122C and node 5 122E have communicated, by analyzing the network traffic 114. As discussed below with reference to FIG. 4, the network topology 120 may be determined in various manners, based on various combinations of network traffic information 114. In some embodiments, the network topology 120 is determined by a third party and then enhanced by the risk assessment system 100, such as to include access information (e.g., from an access control list) overlaid on the network topology 120, as discussed further below.

The risk assessment system 100 may also obtain user account access information 112, e.g., access privileges and/or access records. Thus, the risk assessment system 100 can provide information identifying nodes included in the network topology 120 that a particular user account can access and/or has actually accessed, which is described below with reference to FIG. 2D.

The network topology can be generated and/or updated using various other data sources and/or processes that can be performed on the network, some of which are discussed further below with reference to FIG. 4. For example, in some embodiments the system sends instructions to identified network devices (or some subset of network devices, such as one device per access policy group) to send traceroute requests to other network devices. Information obtained in response to such traceroute requests may be useful in identifying network devices to which the requesting network device actually has access, paths by which access may be obtained, and network devices to which the requesting device does not have access. See FIG. 4, below, for other examples of information that may be included in development of a network topology.

Example Network Topology User Interfaces

Figure 2A:
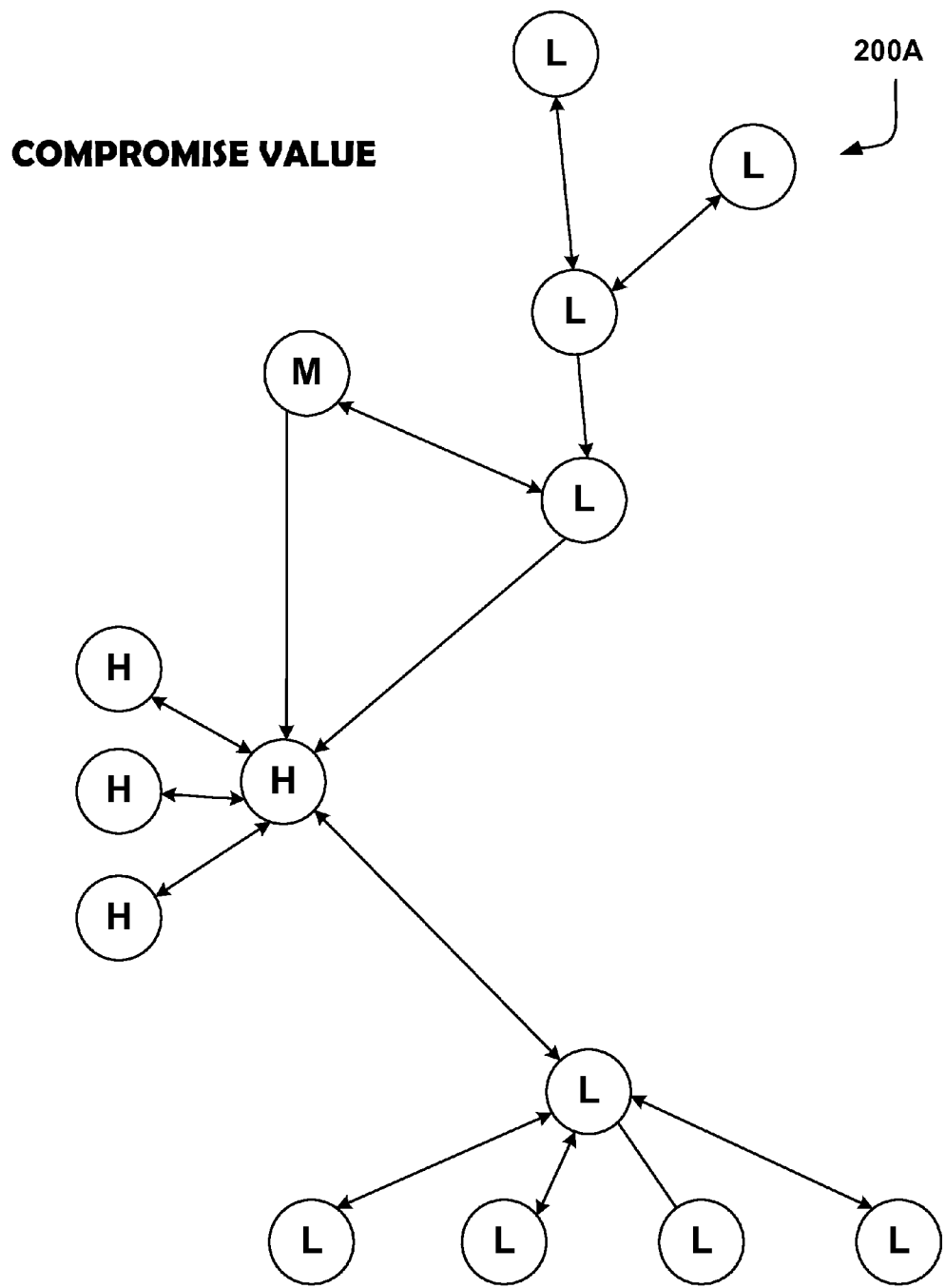
FIG. 2A illustrates an example user interface of a graph identifying a network topology with associated compromise values.

FIG. 2A illustrates an example user interface of a graph 200A identifying a network topology with associated compromise values. The risk assessment system 100 can generate user interface data, e.g., to provide for presentation to a system administrator of the network 110, that includes a representation of a network topology, as described above in FIG. 1. In some implementations, this representation is a graph 200A, e.g., a directed graph as illustrated in the example, which includes nodes each representing one or more network devices, which are connected to other nodes by edges representing logged communications and/or possible communication paths between nodes.

The example of FIG. 2A further illustrates compromise values associated with each node. A compromise value represents an approximate cost that would be incurred, e.g., to a company that owns the network, if the node were compromised, e.g. some portion of its data holdings being made available to an unauthorized party. For instance, the compromise value can be the cost of the data stored by the node, such as a value to recover the data, to pay for specialized services associated with loss of the data, e.g., credit monitoring, costs of insurance deductibles and/or increases in premiums, and/or any other costs. In some embodiments, costs may be estimated based on the type and quantity of specific types of data. For example, each item of credit card data can be associated with a particular compromise value that is higher than the compromise values for telephone numbers of customers. Thus, a compromise value for a node can be calculated by summing the compromise values for each data item, or a particular set of data items of types having values of interest, stored on the node, where each data item has a defined compromise value based on its type (e.g., credit card data, healthcare data, contact information, etc.). The risk assessment system 100 can then associate the calculated compromise values with respective nodes in the graph 200A.

In the example of FIG. 2A, each node in the graph 200A is labeled with a High ("H"), Medium ("M"), or Low ("L") compromise value. That is, the graph 200A provides an easy method of viewing nodes that need to be secured carefully, e.g., due to a node storing sensitive/valuable data associated with a High compromise value. In this way, a system administrator can identify high value nodes for which extra security precautions may be desirable. In securing a node, the risk assessment system 100 can overlay information on the graph 200A displaying nodes that a selected node has access to, e.g., can provide information to, or request information from. Overlaying information describing nodes a selected node has access to is described below, with reference to FIG. 2B. In other embodiments, compromise values may be dollar amounts, and the risk assessment system 100 may calculate a total compromise value for the network from the compromise values for all nodes, a total compromise value of a node, e.g., the compromise value for the node and the compromise values for all accessible nodes, and/or a total compromise value of a user account, e.g., the compromise values for all nodes accessible to the user account.

In some embodiments, nodes may additionally (or alternatively) indicate other attributes associated with network security, such as compromise likelihood (e.g., likelihood of the particular node being accessed by an unauthorized entity) and/or compromise risk value (e.g., some combination of total compromise value and compromise likelihood). Thus, in such an embodiment multiple indicators may be included on each node, such as an indicator of compromise value (e.g., High, Medium, Low, some dollar value indicator, and/or some other indicator), an indicator of compromise likelihood (e.g., High, Medium, Low, or some other relative indicator), and/or an indicator of compromise risk value (e.g., High, Medium, Low, or any other such indicator). In the embodiment of FIG. 2E (discussed below), a total Network Risk Score of "F" ("Failing") is provided, which identifies a network compromise risk calculated based on compromise risk values associated with the entire network.

Figure 2B:
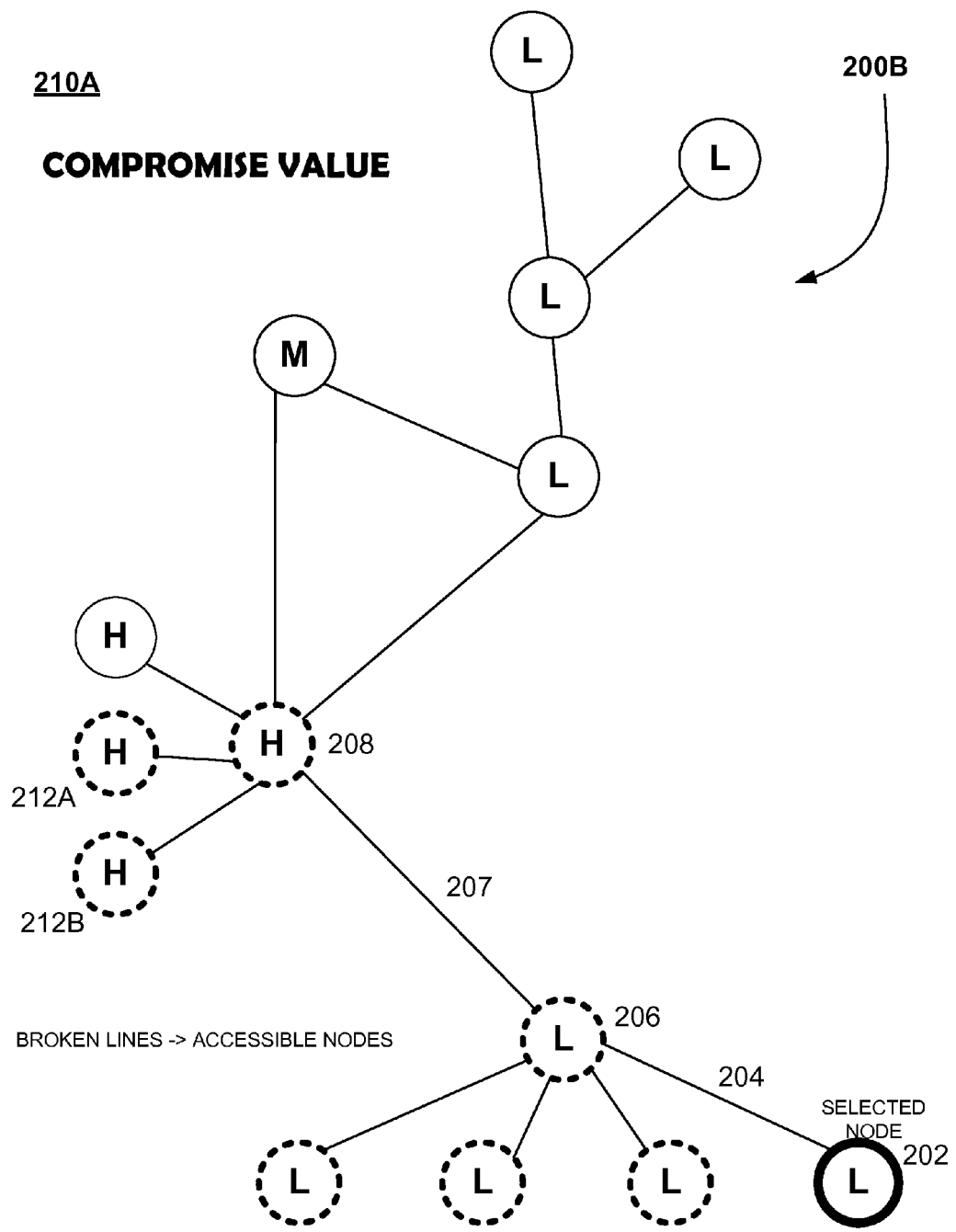
FIG. 2B illustrates an example user interface of the graph showing access rights of a selected node.

FIG. 2B illustrates an example user interface 210A of the graph 200B showing access rights of a selected node 202. The risk assessment system 100 can receive a selection of the node 202, such as by a system administrator clicking on a node of a user interface displaying the graph 200B, and identify nodes that the selected node 202 can access, e.g., communicate with and/or is physically connected to. In some implementations, having access to a node can mean that the selected node 202 can provide a request to the node, e.g., as a ping, or can access data stored at the node.

In this example, the node 202 selected by the system administrator is highlighted with a darker border, and all nodes that can be reached by the selected node 202 are illustrated with broken lines. In other embodiments, other visualizations may be used to identify a selected node and accessible nodes, such as colors, highlighting, etc.

After receiving a selection of node 202, the graph 200B is updated to illustrate that the selected node 202 has access to node 204, e.g., by an edge representing that the two nodes have communicated and/or are configured to communicate within the network. Additionally, the graph 200 illustrates that selected node 202 has access to node 208, e.g., by edge 207. This can occur when, for instance, node 206 has access to node 208, and thus is configured to pass communications from selected node 202 to node 208. Furthermore, selected node 202 has access to nodes 212A and 212B by virtue of node 208.

The graph 200B can be utilized by a system administrator to determine a need for a firewall between nodes 208 and 206, for example, which can be configured to block network traffic from selected node 202, and allow only select network traffic from node 206. In this way, a system administrator can visually examine the network to determine whether particular nodes, e.g., nodes with a low compromise value, have unnecessary access to other nodes, e.g., nodes with higher compromise values.

Figure 2C:
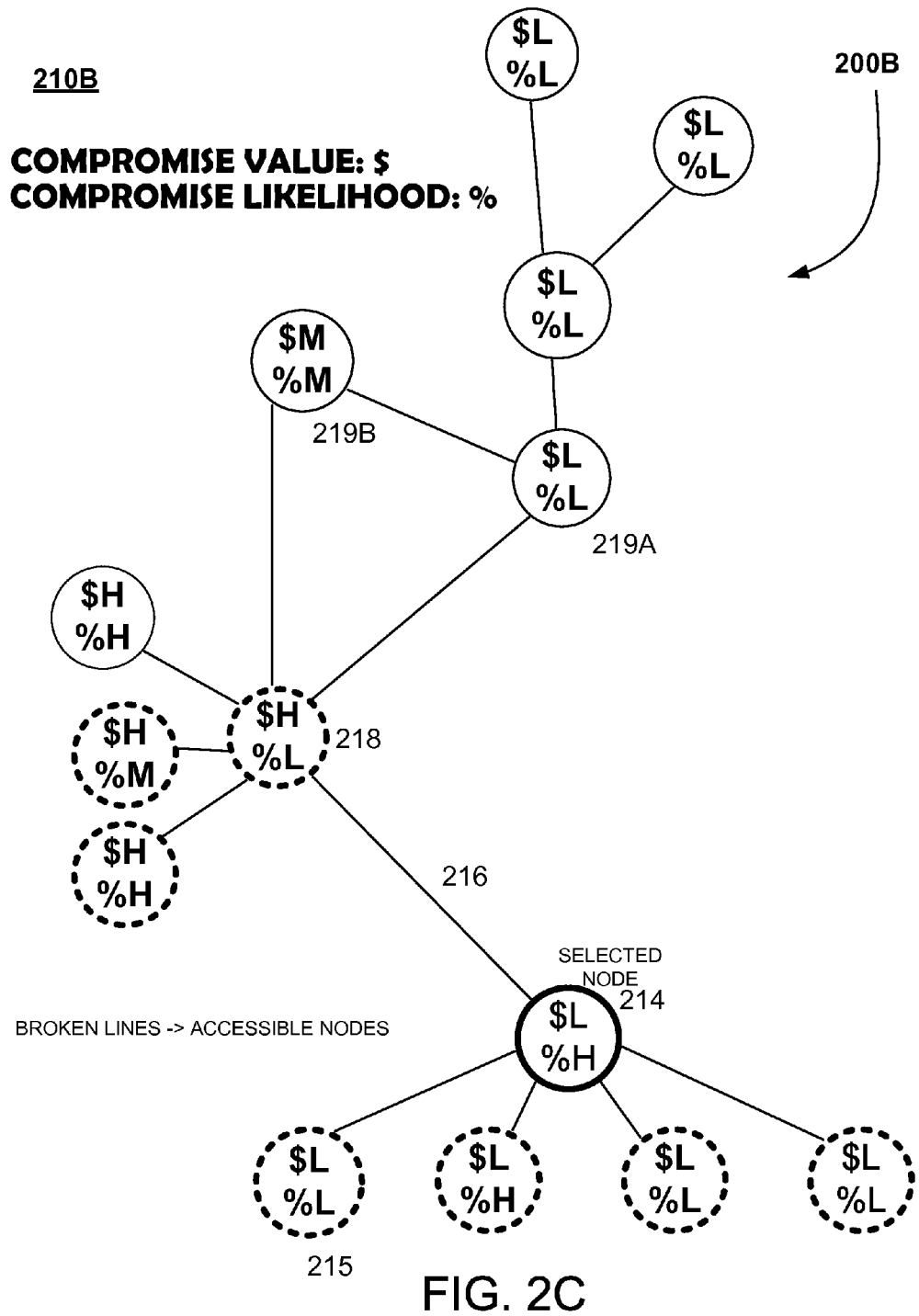
FIG. 2C illustrates another example user interface of the graph showing access rights of the selected node.

FIG. 2C illustrates another example user interface 210B of the graph 200B showing access rights of the selected node 202. The user interface 210B illustrates the graph 200B with nodes, and associated compromise values and compromise likelihoods, e.g., a probability identifying the likelihood that a node can be compromised. Examples of determining compromise likelihood are described below, with reference to FIG. 6.

In this example, the node 214 selected by the system administrator is highlighted with a darker border, and all nodes that can be reached by the selected node 214 are illustrated with broken lines. In other embodiments, other visualizations may be used to identity a selected node and accessible nodes, such as colors, highlighting, etc.

The risk assessment system 100 has determined that node 214 is associated with a low compromise value and high compromise likelihood, e.g., a high probability that the node can be compromised, and node 218 is associated with a high compromise value and low compromise likelihood, e.g., a low probability that the node can be compromised. Based on the information displayed in the user interface 210B, a system administer may consider whether the edge 216 between node 214 and node 218 can be eliminated. Since an attacker could compromise node 214, with a high likelihood of a compromise, to gain access to node 218 with a high compromise value, the system administrator can decide that the edge 214 should be limited, or eliminated. Additionally, the system administrator could alter node 214 to make it harder for an attacker to compromise, e.g., increase password complexity to the node 214, limit user accounts that can access the node 214, limit physical access to the node 214, and so on.

In some implementations, the risk assessment system 100 can determine a compromise risk value for each node, e.g., by multiplying the compromise likelihood and total compromise value for the node. As described above, the total compromise value for a particular node is determined from compromise values of nodes the particular node has access to. In these implementations, the graph 200B can be updated to include the compromise risk value, allowing a system administrator to directly compare nodes. Since each node will have a total compromise value scaled by the probability of it being compromised, the system administrator can quickly identify high risk nodes, e.g., nodes associated with high compromise risk values. In this way, the system administrator can quickly identify the risk to a company if the node was compromised. Examples of determining compromise risk values are described below, with reference to FIG. 6.

Figure 2D:
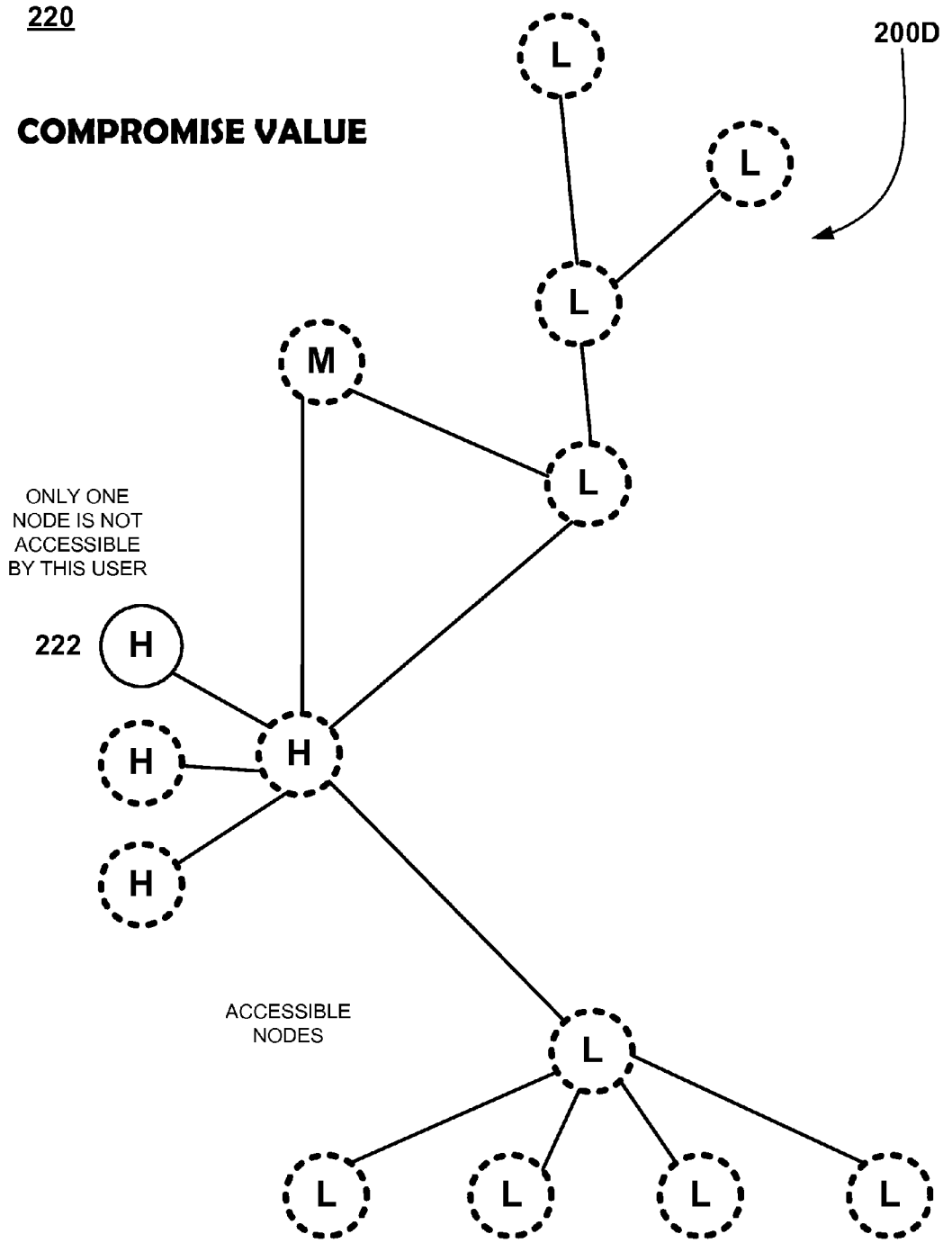
FIG. 2D illustrates an example user interface of the graph showing access rights of a selected user account.
Figure 2E:
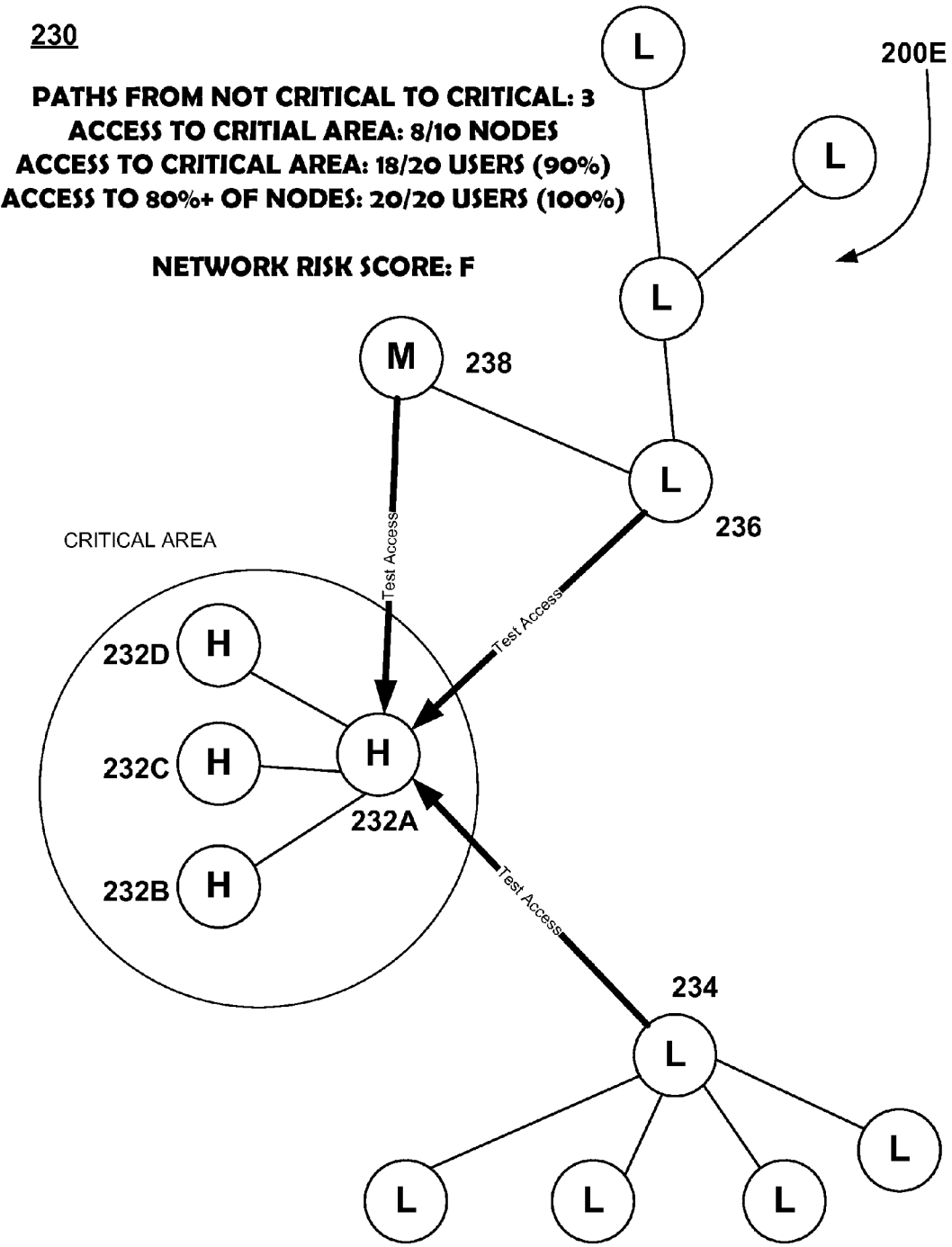
FIG. 2E illustrates an example user interface of the graph showing access rights to an identified critical area of a network.

FIG. 2D illustrates an example user interface 220 of the graph 200D showing access rights of a selected user account. The risk assessment system 100 can receive an identification of a user account, e.g., a user account associated with the network described in FIG. 1. For instance, the risk assessment system 100 can provide a listing of user account names, or search functionality, to a system administrator, and the system administrator can identify a user account. In one embodiment, a user interface that includes a drop-down (or some other selection) user interface component, may be accessed by the system administrator in order to select one or more user accounts. Such a user interface may allow the network administrator to select groups of users, e.g., new hires, contractors, employees in particular departments, etc., filter the user accounts by various attributes, such as hire date, title, etc., and/or provide other searching and filtering functionality that allows the network administrator to easily select one or more user accounts of interest. After receiving the identification of the user account, the risk assessment system 100 can identify nodes that the selected user account can access, e.g., the user account has access rights to, and/or nodes that the user account has actually accessed within a defined period of time. In one embodiment, the user may be provided with one or more user interface controls (e.g., a slider or drop-down menu) that allow adjusting of the access criteria used to determine access rights of the selected user account for display in the network topology, such as a slider that allows adjustment of a time period of actual accesses by the user account to include in the network topology.

To identify nodes that the selected user account can access, the risk assessment system 100 may access user account access information, such as one or more access privileges and/or access records, as defined above. For example, in some embodiments, the risk assessment system 100 discussed herein can map the access rights of a particular user account (or group) onto the network topology (e.g., generated based on NETFLOW, proxy logs, etc.), such that "reach" of the user account within the network can be comprehensively visualized. A similarly mapping may also be performed based on access records for a particular user account, physical access privileges and/or records for a particular user account, or some combination of various access information.

In the example of FIG. 2D, the risk assessment system 100 has determined that the selected user account can access each node in the graph (shown in broken lines), except one node, e.g., node 222. A system administrator using the user interface 220 can inspect the nodes to easily determine whether the selected user account has greater access rights than is warranted, e.g., due to their job position. Additionally, the system administrator can request that the risk assessment system 100 provide actual log-in information over a defined time period, e.g., a selectable time period, and identify whether the selected user account rarely, or never, accesses certain nodes to which the user account has access as such nodes may be candidates for updating their respective ACLs so that the user account no longer has access rights.

In some implementations, the user interface 220 can include a selectable option for updating the network topology to indicate nodes the user account has access to (e.g., based on access rights) and/or has actually accessed (e.g., based on access records). As noted above, in some implementations the risk assessment system 100 can obtain information identifying nodes that a person associated with the selected user account can physically access. For instance, the risk assessment system 100 can obtain lists identifying physical badges worn by people, e.g., employees, and rooms or spaces containing nodes that particular physical badges can access. The risk assessment system 100 can then identify nodes in rooms or spaces that the person associated with the selected user account can physically access.

As described above, the user interface may identify nodes that the selected user account has actually accessed, e.g., over a selectable time period, instead of nodes the user account can access as in FIG. 2D. In this embodiment, unnecessary access to nodes can be identified in the user interface by highlighting nodes that the user account can access, but has never accessed (over some selectable period of time selected by the system administrator, such as a default time period or one that is dynamically adjustable by the system administrator using one or more user interface controls). For example, differences between a particular user account's access rights and that particular user account's access records (for some time period or based on all records)

may be determined in order to identify possible areas for tightening access rights for that user account.

In some embodiments, user accounts may have access to only portions of data on a particular node. Thus, the user interface 220 may be updated with an indication that only parts of a particular node are accessible and may be configured to provide a detailed drill-down of particular directories, files, etc. that the user account has access to in response to a request from the system administrator (such as double-clicking on a particular node).

FIG. 2E illustrates an example user interface 230 of the graph 200E showing access rights to an identified critical area of a network. The risk assessment system 100 can receive an identification of a critical area of the network, e.g., a system administrator can provide identifications of nodes, e.g., nodes 232A-D, that are intended by the system administrator to be critical e.g., important to a company or the network. In some implementations the risk assessment system 100 can automatically identify nodes likely to be critical, e.g., the system 100 can determine compromise values for each node and identify critical nodes as being associated with high compromise values. Determining compromise values is described below, with reference to FIG. 4.

After identifying a critical area of the network, the risk assessment system 100 can identify a percentage of user accounts that can access the critical area of the network, as described above with reference to FIG. 2D, and a percentage of nodes that can access the secure area of the network, as described above with reference to FIG. 2B. That is, the risk assessment system 100 determines the access rights of each node outside of the critical area, and identifies a number of nodes that can access any node in the critical area. The risk assessment system 100 can then compute a percentage of nodes outside the critical area that can access the critical area, and provide the percentage to a system administrator using the user interface 230. Additionally, the risk assessment system 100 can determine a number of edges that connect to a node in the critical area. For instance, in the example the risk assessment system 100 has determined that three edges connect to nodes in the critical area, e.g., node 234 connects to node 232A by an edge, node 236 connects to node 232A by an edge, and node 238 connects to node 232A by an edge. A larger quantity of connections to the critical area may be indicative of an increased risk of compromise of that critical. Any connection to the critical area should be audited to ensure that only authorize traffic can travel across it.

Similarly, the risk assessment system 100 can determine a percentage of user accounts that can access, or have accessed, nodes in the critical area. In the example, the risk assessment system 100 has determined that 18 out of 20 user accounts can access, or have accessed, nodes in the critical area.

In some implementations, the system also calculates one or more metrics related to users' access to the network. For example, a metric indicating a total number of user accounts that have access to a particular area of the network (and/or have actually accessed), such as a defined critical area, or number of user accounts that have access to (and/or have actually accessed) a threshold percentage, or number, of network nodes, e.g., 70%, 80%, 85% (wherein such percentage may be provided by the system administrator). In the example, the risk assessment system 100 has determined that 20 out of 20 user accounts can access 80% of the total number of nodes in the graph. A similar metric could be provided to indicate a percentage of user accounts that have actually accessed at least 80% of the total number of nodes. Furthermore, discrepancies between these two ratio (e.g., have access and actually accessed) may trigger alerts, e.g., recommendations, to the system administrator suggesting tightening of user account access rights in view of actual node access being much lower than available node access.

Example Network Configuration

Figure 3:
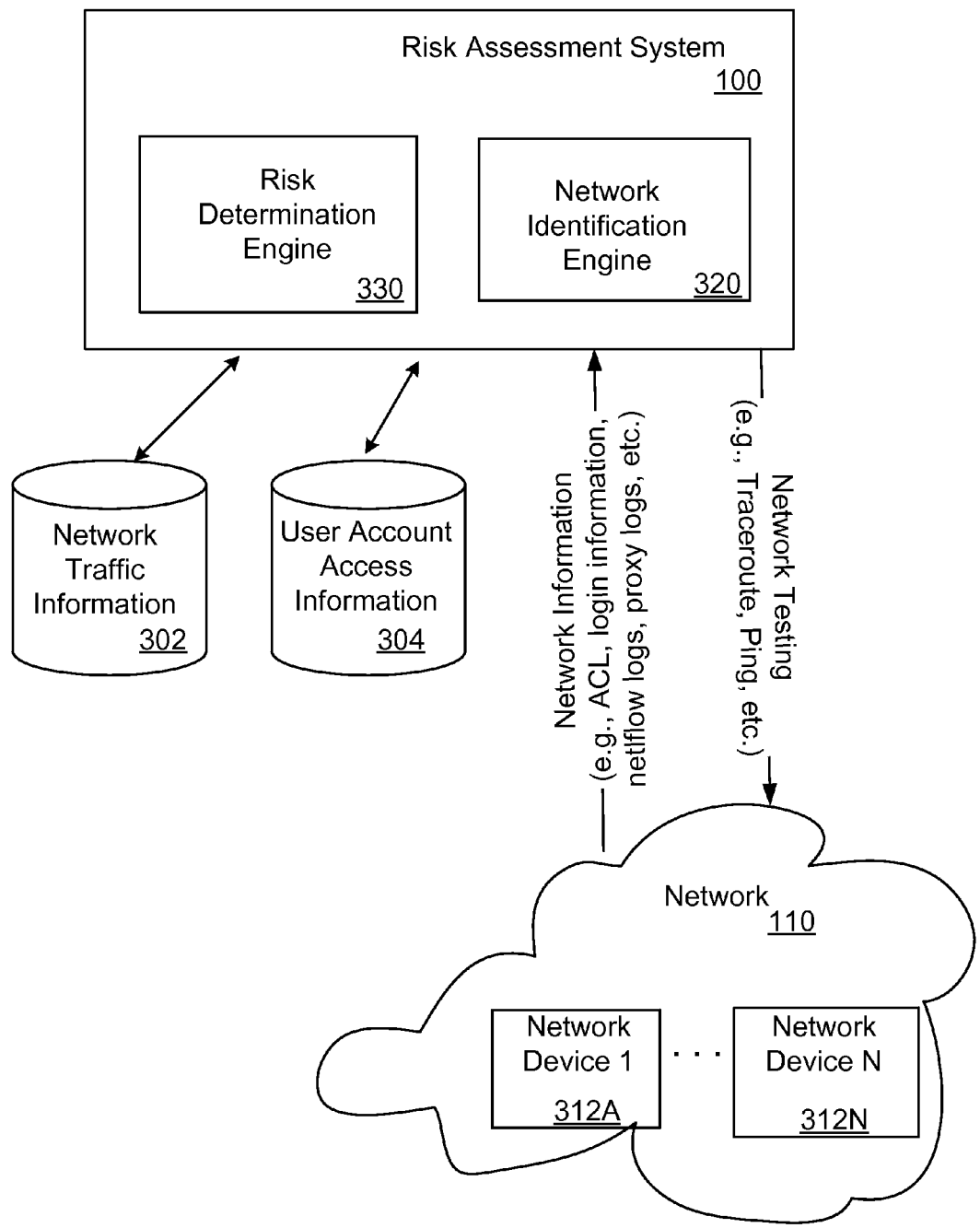
FIG. 3 is a diagram of an example risk assessment system.

FIG. 3 illustrates a diagram of the risk assessment system 100 in communication with the network 110 in order to build and/or enhance the network topology based on access rights of user accounts. In this embodiment, the risk assessment system 100 is shown in communication with the network 110 that includes one or more network devices, e.g., network devices 312A-312N. In some implementations the risk assessment system 100 can be a network device included in the network 110, or can be software executing on a network device.

The risk assessment system 100 is in communication with, or maintains, one or more databases storing network traffic information and user account access information, e.g., the network traffic information database 302 and user account access information database 304.

In one embodiment, the network traffic information database 302 stores router logs, e.g., network traffic data describing communications between network devices such as NET-FLOW data, firewall logs, e.g., data identifying network devices that are permitted to access particular other network devices, and/or proxy logs, e.g., data describing network devices that request or receive information through a proxy server. Additionally, the risk assessment system 100 can provide requests, e.g., traceroute requests or pings, to network devices included in the network 110, and receive identifications of network devices that the request was routed through. In this way the risk assessment system 100 can actively identify network devices in communication with each other, e.g., network devices that can provide information to, or receive information from, other network devices. The risk assessment system 100 can then use these identified network device communication paths to enrich the network topology 120 or store these identified network device communication paths in the network traffic information database 302.

In one embodiment, the user account access information database 304 stores access information describing a level of access that a user account, e.g., a user account of the network 110, has with a network device included in the network 110. For instance, user account access information can include identifications of user accounts that are permitted to access a network device, e.g., log into the network device, or user accounts that can request data from or send data to a network device, e.g., ping the network device. The information can be obtained from access rights associated with respective nodes of the network 110. For example, rights of each network node in an Access Control List ("ACL") may be parsed in order to determine, for each user account, which network nodes the user account can access. The user account access information may also include information obtained from access records particular to each network node included in the network 110, e.g., information identifying user accounts that have accessed a network device, or directory information identifying user accounts. In some implementations, the information can identify network nodes that particular persons associated with user accounts can physically touch and/or has physically touched, e.g., physical access rights or physical access records. For instance, as described above in FIG. 2D, the information can identify badges worn by people that allow entry into a room or space containing particular network devices.

The risk assessment system 100 includes a network identification engine 320 configured to obtain information stored in the network traffic information database 302 and determine and/or update a network topology of the network 110. As noted above, a network topology identifies nodes in the network 110, e.g., one or more network devices grouped as a node, and connections between the nodes, e.g., network devices permitted to access other network devices. Additionally, the risk assessment system 100 can actively provide requests to network devices included in the network 110, e.g., traceroute requests, to identify connections between network devices. The risk assessment system 100 can also direct network devices in the network 110 to provide requests to other network devices, e.g., to identify connections between network devices, and receive indications of whether requests to respective devices was successful. Examples of actively providing requests are described below, with reference to FIG. 4.

In some embodiments, an initial network topology may be generated by a third party service or software, and then the risk assessment system 100 updates the network topology with additional information, such as user account access information, proxy logs, etc. Thus, the network identification engine 320 can associate user account access information with the network topology. For instance, the network identification engine 320 can store mappings between nodes determined in the network topology, and user accounts permitted to access the nodes.

Additionally, the risk assessment system 100 includes a risk determination engine 330 to determine risks associated with the network 110 being compromised, e.g., by an attacker. For instance, the risk determination engine 330 can determine compromise values associated with each node, e.g., approximate costs that would be incurred to a company that owns the network 110 if one or more network devices were compromised. The risk determination engine 330 can then identify nodes that each user account, node, or group of user accounts or nodes, is permitted to access, and determine a total compromise value. The total compromise value represents approximate costs that would be incurred if a particular user account, or particular node, were compromised. Furthermore, the risk determination engine 330 can determine a total compromise value for the entire network 110, e.g., from respective compromise values of each node. Examples of determining a total compromise value are described below, with reference to FIG. 7.

The risk determination engine 330 can also determine compromise likelihood for each node, and user account, associated with the network 110. The compromise likelihood identifies a probability of the node, or user account, being compromised. Examples of determining compromise likelihood are described below, with reference to FIG. 6. The risk assessment system can then determine a compromise risk value for each node, or user account, from the compromise likelihood for the node, or user account, the total compromise value for the node, or user account, and possible other attributes associated with the node and/or user account. In one embodiment, the compromise risk value is a scaled version of the total compromise value, scaled by the compromise likelihood (e.g., probability that the node, or user account, can be compromised). Examples of determining compromise risk values are described below, with reference to FIG. 6.

The risk determination engine 330 can also generate user interface data identifying the network topology, described above, and risks associated with the network 110. In some implementations the risk determination engine 330 generates a graph of nodes and edges, with each node representing one or more network devices, and each edge identifying a connection between two nodes. The user interface data is configured to be provided for presentation, and receive interactions from a system administrator using the risk assessment system 100. Example user interface data is described above, with reference to FIGS. 2A-2E.

Example Methods

Figure 4:
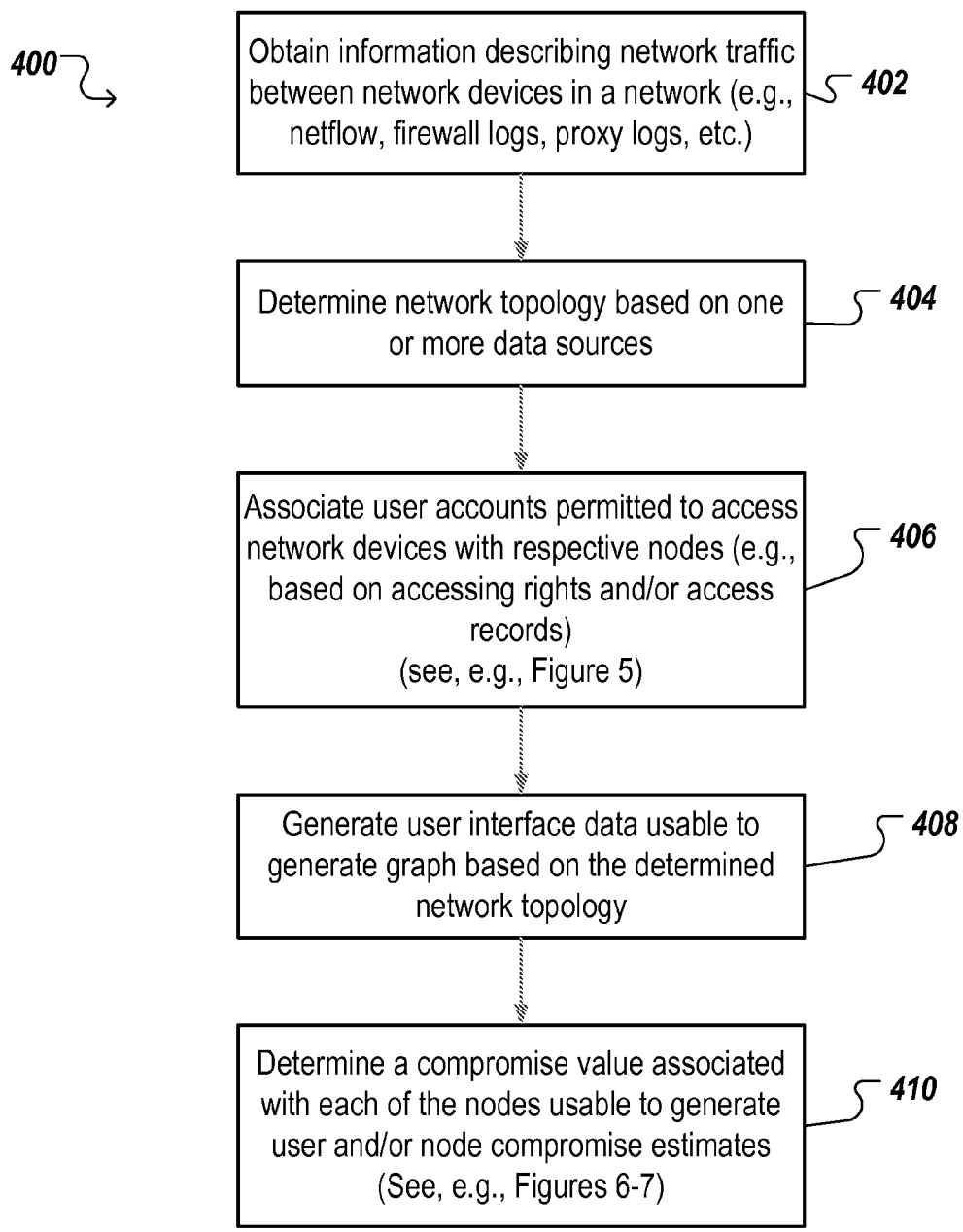
FIG. 4 illustrates a flowchart of an example process for network risk assessment.

FIG. 4 illustrates a flowchart of an example process 400 for network risk assessment. For convenience, the process 400 will be described as being performed by a system of one or more computers, e.g., the risk assessment system 100. Depending on the embodiment, the method of FIG. 4 may include fewer or additional blocks and the blocks may be performed in an order that is different than illustrated.

In the example of FIG. 4, the system obtains information describing network traffic between network devices in a network (block 402). The system can obtain the information, e.g., router logs, router rules, firewall logs, and so on, from one or more databases. Information describing network traffic is any information that identifies one or more network devices that can communicate with, or access, each other. In some implementations, the system maintains the databases and retrieves the information, e.g., from routing devices, for storage in the databases. In some other implementations, the system can access the databases that have been pre-populated with information describing network traffic.

As described above, the information can be from routing systems that route requests from a network device to an appropriate receiving network device. Routing systems can include routers, and proxy servers that hide an identification of the requesting network device and route the hidden request to a receiving network device. As described below in block 404, the system may obtain proxy logs to identify that two network devices are in communication with each other, even though a proxy server would ordinarily hide that reality.

In some implementations the system can actively determine network devices that can communicate with, or access, each other by providing traceroute requests to all network devices. A traceroute request reports the route that the request took to get a receiving network device, e.g., the network devices and routers that the request was provided to. If the system receives a response identifying the traceroute, the system can store information identifying all the network devices involved in the response and the respective connections between them. Additionally the system can provide a traceroute request to all possible addresses of network devices on particular subnets, e.g., the system can cycle through all permutations of network addresses in the subnet, and identify network devices from traceroute requests that receive a response.

Next, the system determines a network topology from the information describing network traffic (block 404). A network topology identifies nodes that each represents one or more network devices connected by edges, with each edge representing a communication link. Each edge can be associated with a direction from a node to another node, e.g., identifying a direction of communication. Additionally edges can be bi-directional. In some implementations, the system can represent all network devices that belong to a particular subnet as being a single node. In some other implementations, a system administrator using the system can identify that more than one network device is to belong to a single node.

To determine the network topology, the system can obtain router logs, e.g., NETFLOW data, that identifies network traffic between network devices that provide requests to, or receive requests from, routers. The system then identifies pairs of network devices that have communicated, and represents the network devices as nodes connected by respective edges.

The system can also obtain firewall logs, and identify network devices expressly permitted to communicate with, or access, other network devices. Additionally, the system can obtain proxy logs, and identify a requesting network device, and a receiving network device. Since a proxy server hides the requesting network device's address, e.g., network address, from the receiving network device, discovering whether two network devices are in communication with each other would be difficult without proxy log information. The system can also utilize router rules, e.g., rules specifying a method of routing requests received from particular network devices. In this way the system can determine, from the rules, that two network devices are in communication with each other by identifying a router rule specifying the communication.

In some implementations, the system can obtain information identifying network devices that are physically connected, e.g., by a direct wired or wireless connection. The system can store these connected network devices as nodes connected by edges in the network topology.

Moving to block 406, the system associates identifications of user accounts permitted to access network devices with respective nodes of the network topology. For example, the system obtains access information from one or more access rights, access records, and/or other sources. Such information may indicate user accounts that have access to respective nodes and user accounts that have actually accessed nodes within a defined time period (e.g., the previous week, month, year, or selectable time period), respectively. From this user account access information, the system may associate identifications of the user accounts with nodes that include the accessible and/or accessed nodes. In one embodiment, the system first overlays access records and then access privileges onto the network topology generated in block 404 to provide a network topology with overlaid access rights and access history information.

In some implementations, the system can provide information, e.g., to a system administrator, identifying user accounts permitted to access nodes that they haven't actually accessed in a selectable period of time, e.g., one month, 3 months, one year.

Furthermore, the system can obtain physical active control list (ACL) badge information to identify rooms containing network devices that a person associated with a user account can physically access. Nodes including the network devices in the identified rooms are associated with (e.g. indicated as accessible by) identifications of the user accounts.

Examples of associating identifications of user accounts with nodes are further described below, with reference to FIG. 5.

The system generates user interface data identifying the network topology (block 408). In some implementations, the system generates a graph that identifies the network topology, e.g., FIG. 2A. The graph can be a directed graph, and each node in the graph can correspond to a node in the network topology. Similarly, each directed edge in the graph can correspond to an edge in the network topology. In some other implementations, the system generates a table that identifies all nodes that each particular node can access.

This user interface data can be provided for presentation, e.g., to a system administrator using the system. Additionally, the system can receive interactions with the user interface data and update the user interface according to the interaction discussed above, e.g., FIGS. 2A-2D. for example, a network administrator can click on a particular node of a network topology in order to cause the system to automatically determine access rights associated with that node and display those in the network topology (e.g., via some type of overlay, such as coloring certain nodes, shading certain nodes, hiding nodes that are not accessible by the selected node, etc.). In addition, the network administrator may be able to zoom in and out of the network to view additional detail or less detail regarding the network topology. For example, in response to a zoom level being decreased (to view more of the network topology), the system may group nodes (such as nodes that each have a common connection to a particular node) for simplified presentation of that group of nodes. The network administrator can manipulate and explore the network topology before compromise values are calculated and/or after such compromise values are calculated. In one embodiment, compromise values may be calculated in response to a network administrator selecting one or more nodes on a network.

In the embodiment of FIG. 4, the system determines a compromise value associated with each node in the network topology (block 410). A compromise value represents an approximate cost that would be incurred, e.g., to a company that owns the network, if the node were compromised, e.g., by an attacker. For nodes that include more than one network device, e.g., multiple network devices that are part of the same subnet, the system can determine compromise values of those multiple network devices, and compute a sum of the network devices for the node.

For instance, the compromise value can be the cost of the data stored by the node, such as a value to recover the data, a value to ensure that all data stored by nodes has not been tampered with, a value to pay for specialized services associated with loss of the data (e.g., credit monitoring), costs of insurance deductibles and/or increases in premiums, and/or any other costs. The compromise value of a node can also be the cost incurred by a company that owns the network if the node were out of service, e.g., offline. The cost can be the cost incurred per day by the company, or cost incurred hourly (or any other unit of time). The compromise value can also factor in the cost to replace the node, and information stored on it. Additionally, any compromise of the network can be associated with a compromise value which is in addition to a compromise value of each node, e.g., a reputational compromise value. This reputational compromise value identifies an expected loss to the company that operates the network, e.g., any quantifiable loss of investor faith, loss of consumer faith, or costs incurred with respect to average legal fees to defend itself in a lawsuit by a government or a consumer.

In some implementations the system can obtain information that describes what each node stores, and determine an associated compromise value from the information. To determine an associated compromise value, the system can store mappings between specific types of information and associated costs. For instance, if the system obtains information a particular node that stores credit card information, the system can identify an associated cost in the mappings, e.g., cost per particular credit card. In some other implementations, the system can receive approximate costs of information stored in a node, e.g., from a system administrator using the system.

In some implementations, the system can provide an identification of the compromise values to a system administrator using the system as an overlay of the graph identifying the network topology, e.g., FIGS. 2A-2E.

After determining compromise values, the system can receive identifications of user accounts, or nodes in the network topology, and determine a total compromise value associated with all nodes that the user account, or identified node, can access. In this way a company can quickly identify the potential costs incurred to them if any user account, or network device, were compromised. Examples of determining total compromise values are described below, with reference to FIG. 7.

Figure 5:
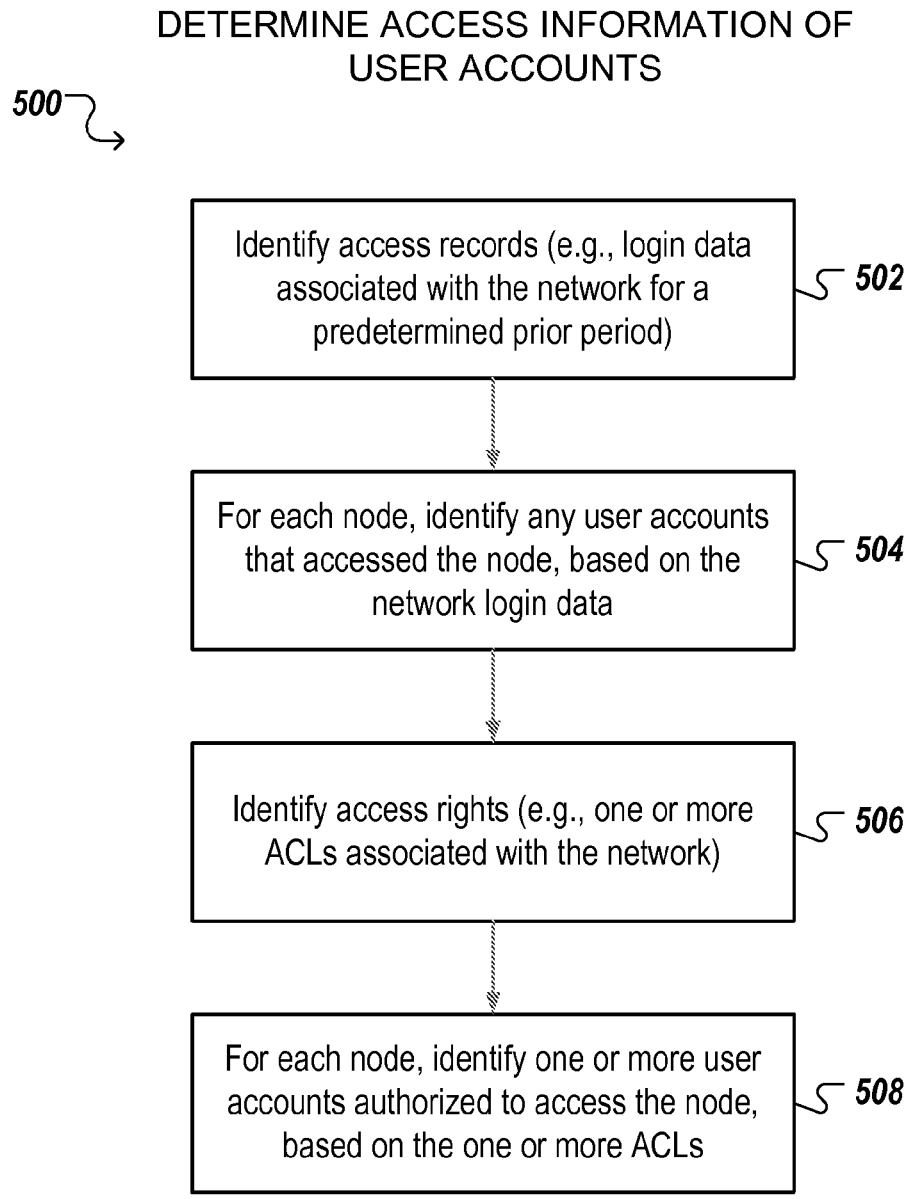
FIG. 5 illustrates a flowchart of an example process for determining access rights of user accounts.

FIG. 5 illustrates a flowchart of an example process 500 for determining access rights of user accounts. For convenience, the process 500 will be described as being performed by a system of one or more computers, e.g., the risk assessment system 100. Depending on the embodiment, the method of FIG. 5 may include fewer or additional blocks and the blocks may be performed in an order that is different than illustrated. Additionally, the system can perform blocks 502-504 in parallel with blocks 506-508. For example, the processes of analyzing access records and analyzing access rights may not be dependent on one another. Thus, access rights may be analyzed independent of access records, and such analysis may even be performed concurrently in order to obtain potentially unnecessary privileges associated with the user account.

The system identifies access records, such as network log-in data, associated with the network (block 502). As noted above, access records may describing user accounts that have logged into, e.g., accessed, particular network devices. The access records can be actively obtained from each network device and/or from a database storing log-in data. For instance, the system can provide a request to each network device to receive log-in data, e.g., data describing user accounts that have logged into the network device. The access records can include historical log-in data, e.g., log-in data from the prior quarter, month, or year (or any other period of time).

The system identifies user accounts that accessed nodes using the access records (block 504). The system scans the access records to identify user accounts, and network devices that each of the user accounts have accessed. The system then associates identifications of user accounts with respective nodes in the network topology.

The system identifies access rights associated with the network (block 506). As noted above, access rights can identify user accounts permitted to access each network device, e.g., over a network, regardless of whether the user account actually has accessed the network device. Additionally, physical access rights can identify whether persons associated with user account can physically touch network devices, e.g., whether the persons have access to rooms that contain particular network devices.

The system identifies user accounts permitted to access nodes (block 508). As described above in block 506, the system identifies user accounts permitted to access, e.g., over a network or physically, network devices. The system then associates identifications of the user accounts with nodes in the network topology that include the respective network devices.

With the information regarding nodes that the selected user account can access (e.g., based on access rights) and information regarding nodes that the selected user account actually has accessed (e.g., based on access records), the system can determine a recommendation for reduction of access rights to the particular user account, such as to remove access rights to any network nodes (or other object on the network) that the user account has not actually accessed (e.g., within the time period determined by the network administrator), but for which the user account has access rights. Such a recommendation may be provided to the network administrator via many manners, such as by highlighting nodes on a network topology (e.g., overlaid on any of the network topologies of FIG. 2) for which access rights may be removed. In some embodiments, the suggested reduction of access rights may be implemented via the same user interface by the network administrator selecting a button or other UI control indicating a desire to have the system automatically implement such suggested reduction in access rights.

Figure 6:
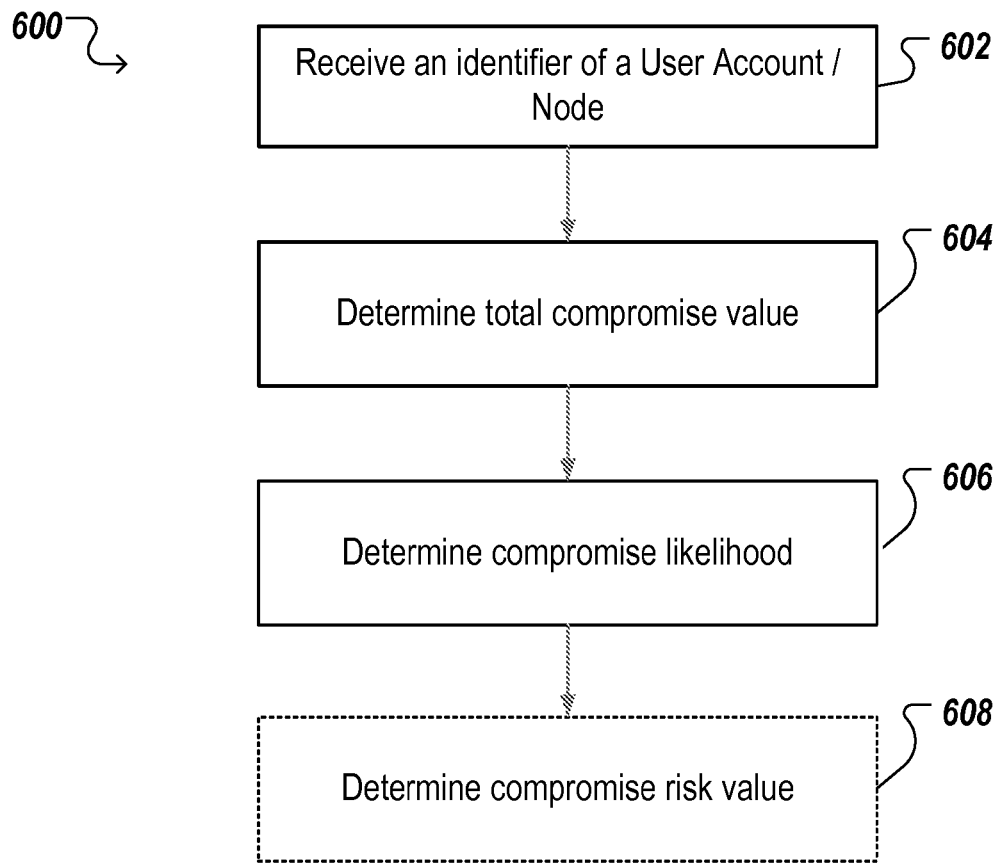
FIG. 6 illustrates a flowchart of an example process for determining a compromise risk value associated with a user account or node.

FIG. 6 illustrates a flowchart of an example process 600 for determining the compromise risk value associated with a user account or node. For convenience, the process 600 will be described as being performed by a system of one or more computers, e.g., the risk assessment system 100. Depending on the embodiment, the method of FIG. 6 may include fewer or additional blocks and the blocks may be performed in an order that is different than illustrated.

The system receives an identification of a user account or node (block 602). A system administrator can provide a user account name, or the system can provide search functionality to help facilitate identifying a user account. In one embodiment, the system performs the below-noted process for each user account and/or user account group to develop compromise risk value for each and provides a sorted listed of the accounts and account groups. Thus, the system administrator may be provided with a list of users or user groups having the highest total compromise values and/or likelihoods and may assess whether access controls with reference to those users or user groups should be tightened to reduce compromise risk values.

The system administrator can also identify the network address of a network device included in a node, or provide an identification, e.g., a name, of the node. In some implementations the system administrator can provide a selection of the node as presented in the graph identifying the network topology, described above with reference to block 408 of FIG. 4.

The system determines a total compromise value of the user account or node (block 604). The system obtains all nodes that the user account, or node, is permitted to access, e.g., from the information determined in FIG. 5. The system then obtains a compromise value for each of the obtained nodes, and determines a total compromise value from the obtained compromise values. In some implementations the system can sum the obtained compromise values to determine a total compromise value. In some implementations the system can apply weights to each of the obtained compromise values, e.g., scaling factors, to determine the total compromise value. Examples of determining a total compromise value are described below, with reference to FIG. 7.

The system determines a compromise likelihood for the user account or node (block 606). The system determines a probability, or decimal value, that the user account, or node, can be compromised.

For example with a user account, the system can obtain information identifying a complexity of the user account password, the location that a person associated with the user account normally logs into nodes from, a length of time the person has worked at the company that controls the network, one or more values identifying an importance of the user account, and so on. This information can be provided to a machine learning model, e.g., a neural network, a Gaussian mixture model, and so on, and the system can obtain a probability identifying a chance the user account will get compromised.

For example with a node, the system can obtain information identifying user accounts that are permitted to access the node, and obtain information identifying password complexities of each user account, locations that persons associated with the user accounts normally log in from, length of time that the persons have worked at the company, and so on. Additionally, the system can obtain information describing how easy, or hard, it is for persons to access, e.g., physically access, the node. The system can identify whether the node is associated with a high compromise value, e.g., identifying that the node is an important target, or whether the node is permitted to access another node with a high compromise value. Compromise likelihood may consider linkages (e.g. proximity to insecure parts of the network like the demilitarized zone of the network), attributes (e.g. software version) for a given node, and/or an academic theory like attack graphs in computing a compromise likelihood for a node. This information can be provided to the machine learning model, described above, and the system can obtain a probability identifying a chance the node will get compromised.

In some implementations the system determines compromise likelihoods for each node after, or before, determining the compromise value for the node, described above with reference to block 410 of FIG. 4. Similarly, the system can determine compromise likelihoods for each user account. That is, the system can automatically determine a compromise likelihood for each user account, or node, e.g., without system administrator action. After determining the network topology, the system can provide information identifying the network topology, e.g., a graph, and include the compromise value and compromise likelihood for each node in the graph, e.g., described above with reference to FIG. 2C.

In the embodiment of FIG. 6, the system determines a compromise risk value for the user account or node (block 608). For example, the system obtains the total compromise value, determined in block 604, and the compromise likelihood, determined in block 606, and determines a compromise risk value for the user account or node. In some implementations the system computes a multiplication of the total compromise value by the compromise likelihood, e.g., decimal representation of the compromise likelihood to arrive at the compromise risk value for the selected user account or node. In other embodiments, the compromise risk value may be calculated based on other combinations of total compromise value, compromise likelihood, and/or other factors.

The system can then provide the compromise risk value for presentation to a system administrator, who can identify a scaled version of the risk of a user account, or node. For instance, a system administrator can directly compare any arbitrary node, or user account, and identify nodes, or user accounts, that are high risk, e.g., have a high compromise risk value.

Additionally, the system can automatically determine a compromise risk value for each node and/or each user account, associated with the network. The system can then determine a network compromise risk value, e.g., by combining in some manner, such as summing, the compromise risk values for each node and/or user account in the network. The network compromise risk value identifies a compromise risk value for the entire network, and can then be provided to a system administrator to obtain a high level estimation of the overall risks associated with the network. A network compromise risk value may also be compared to other network compromise risk values, e.g., of other organizations, such as by an insurance provider in order to establish relative risks associated with a network.

Figure 7:
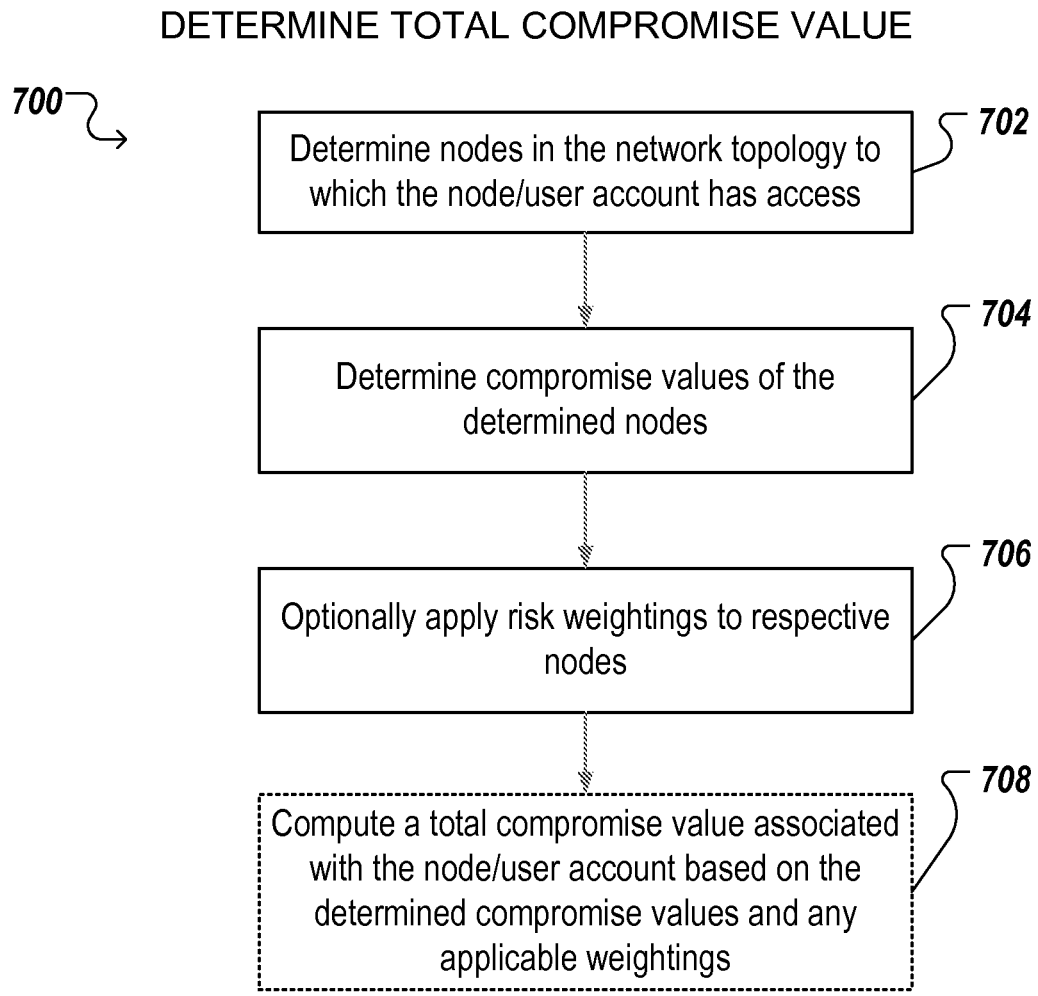
FIG. 7 illustrates a flowchart of an example process for determining a total compromise value associated with a user account or node.

FIG. 7 illustrates a flowchart of an example process 700 for determining a total compromise value of a node or user account. For convenience, the process 700 will be described as being performed by a system of one or more computers, e.g., the risk assessment system 110. Depending on the embodiment, the method of FIG. 7 may include fewer or additional blocks and the blocks may be performed in an order that is different than illustrated.

The system determines nodes in the network topology which the selected node or user account has access (block 702). As described above, in step 602 of FIG. 6, the system can receive a selection of a user account or node, e.g., by a system administrator.

For a node, the system determines all communication paths from nodes in the network topology, determined in block 404 of FIG. 4, to the selected node, and stores information identifying the determined nodes. In some implementations, the system can provide an identification of the determined nodes to a system administrator as an overlay of the graph identifying the network topology, described above with reference to block 408 of FIG. 4. For example, the system can shade the determined nodes as presented to the system administrator on the graph. In another example, the system can present the determined nodes with hatched lines, e.g., FIG. 2B, or can color the determined nodes differently than remaining nodes.

Similarly for a user account, the system determines all nodes that the user account is permitted to access, e.g., from the information determined in FIG. 5. In some implementations, a system administrator can specify whether he/she is interested in nodes the selected user account has accessed in a previous time period, and/or nodes the user account is permitted to access, either physically or over a network.

In some implementations, the system can provide an identification of the determined nodes to a system administrator using the system as an overlay of the graph identifying the network topology, such as in the example of FIG. 2D and as described further above with reference to block 408 of FIG. 4. For example, the system can shade or color the determined nodes as presented to the system administrator on the graph. In another example, the system can present the determined nodes with hatched lines, e.g., FIG. 2D, or can color the determined nodes differently than remaining nodes.

In this example, the system determines compromise values of the determined nodes (block 704). For example, the system may determine compromise values for each node the user account, or node, is permitted to access. Determining a compromise value is described above, with reference to block 410 of FIG. 4.

The system, optionally, applies risk weightings to respective nodes (block 706). After obtaining compromise values for each node, the system can apply respective weights to the nodes, e.g., apply a scaling factor to each compromise value. In some implementations, the system can apply a higher weighting to a node that has been previously identified as being part of a critical area, e.g., the critical area identified in FIG. 2E. In some implementations, the system can receive weights to apply to particular nodes, e.g., a system administrator can specify that particular nodes are of a greater importance than other nodes.

The system computes a total compromise value (block 708). In some implementations, the system computes a sum of the compromise values obtained for each identified node that the selected user account, or node, can access. In some other implementations, the system applies the weightings of block 706 to respective compromise values of nodes, and sums the output to obtain a total compromise value.

The system can then provide the total compromise values for particular nodes for presentation, e.g., to a system administrator as an overlay of the graph described in FIG. 4.

The system can also determine a compromise value of the entire network, e.g., the system can perform blocks 702-708, and assumes that all nodes are accessible in block 702. In this way the system can then provide a compromise value of the network, e.g., for presentation, to a system administrator.

In addition to the description of FIGS. 1-7 above, the system, e.g., the risk assessment system 100, can generate and provide recommendations to a system administrator using the system, e.g., a network administrator. For instance, the system can automatically identify changes in the network, e.g., the network 110, that will lower total compromise values, compromise likelihoods, and/or compromise risks associated with the network and/or specific user accounts and/or nodes. The system can obtain information identifying nodes that user accounts have actually used in a defined time period, and determine whether blocking access to remaining nodes, e.g., nodes user accounts don't actually use, will lower the compromise risk values of the user accounts to a greater degree than the cost of implementing the changes, and may even provide suggestions on user access rights to further restrict. For example, the system may provide recommendations to limit users' access rights to only those resources, e.g., nodes or objects within nodes, that particular user accounts have accessed within some previous time period, such as 30 or 60 days. In some embodiments, the system may have sufficient user access rights to ACL settings on nodes of the network to actually initiate changes of user access rights, such as by transmitting information regarding changes to ACL rules to respective nodes.

Additionally, the system can determine whether limiting access to particular nodes, e.g., nodes identified as being included in a critical area, will provide a greater decrease in compromise risk value, e.g., in units of dollars, than the cost of implementing the changes. To determine whether the recommended network changes will result in a greater benefit than cost incurred, the system can obtain information describing average costs of components needed to effect the recommendation, e.g., firewalls, added software to control security, added personnel costs, and so on.

The system can weigh the costs incurred to make the recommended changes against the benefit, e.g., the reduction in compromise risk values, and provide a recommendation to a system administrator that is determined to have the greatest benefit/cost incurred tradeoff. Additionally the system can receive an identification of a budget, e.g., from the system administrator, and determine recommended network changes to the network 110 that fall within the budget.

Example Network Segmentation Recommendations

The system can also perform processes to determine maximum network segmentation. That is, the system can determine a number of communication paths between nodes in the network topology, and determine whether the number can be limited. For instance, the system can limit the number of communication paths from nodes that aren't critical to critical nodes, or from nodes associated with low compromise values to nodes associated with high compromise values. To effect this recommended segmentation, the system can provide recommendations of network components, e.g., firewalls, proxy servers, and provide the recommendations as an overlay on the user interface graphs described in FIGS. 2A-2E.

Standardized Risk Assessment

In addition to the system providing recommendations to a system administrator, the system can be utilized by an insurance provider to quote potential insurance rates, e.g., premiums, to a company, for losses incurred by networks being compromised. Since the system provides an actual analysis of the network, e.g., compromise values, compromise risk values, and an analysis of user account and node access rights, the insurance provider can determine accurate insurance rates. Additionally, the insurance provider can provide a questionnaire to a company about their security protocols, e.g., access rights of employees, alarm systems, and so on. The answers to this questionnaire can be incorporated by the insurance provider to determine insurance rates.

The insurance provider can determine insurance premiums by obtaining an average compromise value per node in the network, average compromise value per node in an identified critical area of the network, or a network compromise risk value. The insurance provider can then tie the above information to one or more actuarial tables that identify costs for insuring a company given the information. Additionally, the insurance provider can generate actuarial tables for different sectors of an economy, such as based on compromise risk values for multiple entities within each of those sectors. The various uses of compromise risk values can advantageously be used by an insurance provider (and others) to compare network security risks associated with each of multiple networks, such as those within the same vertical market or sector. For example, an administrator may compare risks associated with two different networks of a company to identify networks of relative higher risk.

To determine actuarial tables, the insurance provider can receive information from multiple companies identifying network compromise risk values (and/or underlying compromise values of particular nodes and/or compromise risk values of particular nodes or user accounts), and use the information to determine insurance rates. The insurance provider therefore has a look into the actual state of a broad segment of the networks utilized by companies, giving the insurance provider insight into the proper insurance rates to quote. The insurance provider can also provide information to a company identifying how risky their network is, e.g., the company has high compromise risk values or a high network compromise risk value compared to its peers, or the company is giving access to rights to too great a number of user accounts or nodes compared to its peers.

Example System Implementation and Architecture

Figure 8:
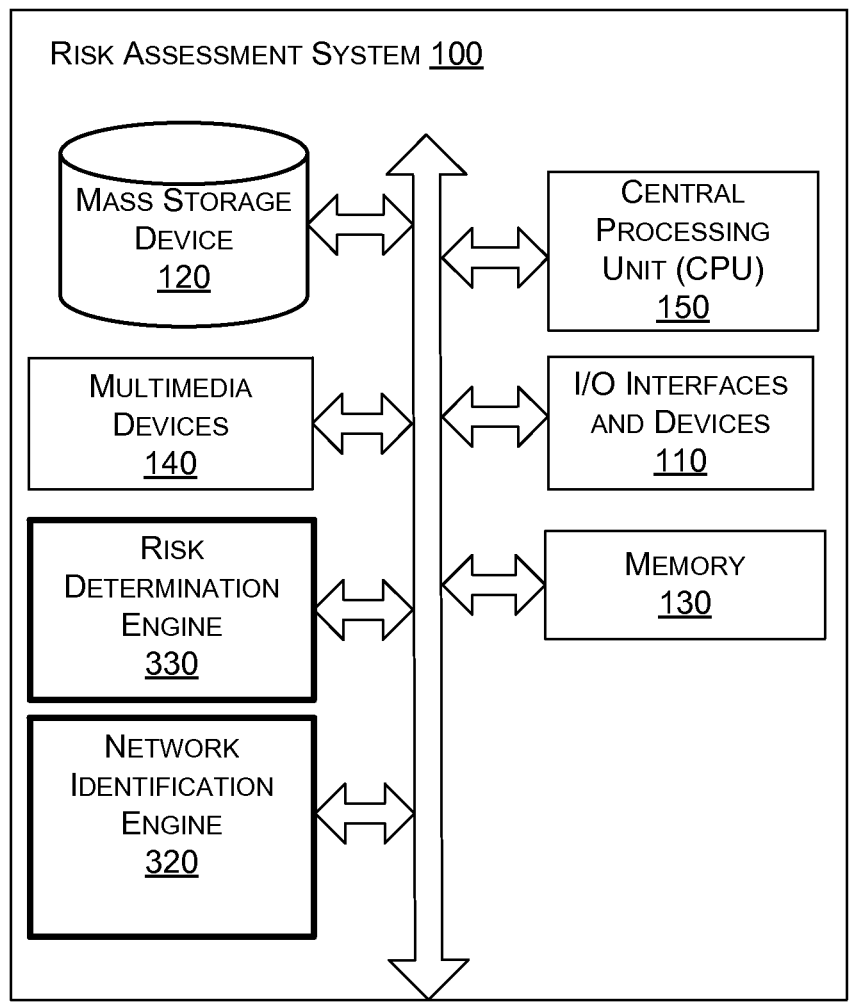
FIG. 8 is a block diagram of an embodiment of the example risk assessment system.

FIG. 8 is a block diagram of one embodiment of the risk assessment system 100, including example components and modules. In the embodiment of FIG. 8, the risk assessment system 100 includes the risk determination engine 330 and network identification engine 320 discussed above with reference to FIG. 3. These "engines," which are also referred to herein as "modules," are configured for execution by the CPU 150 and may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The risk assessment system 100 includes, for example, one or more servers, workstations, or other computing devices. In one embodiment, the exemplary risk assessment system 100 includes one or more central processing units ("CPU") 150, which may each include a conventional or proprietary microprocessor. The risk assessment system 100 further includes one or more memories 130, such as random access memory ("RAM") for temporary storage of information, one or more read only memories ("ROM") for permanent storage of information, and one or more mass storage device 120, such as a hard drive, diskette, solid state drive, or optical media storage device. Typically, the modules (or "engines") of the risk assessment system 100 are connected to the computer using a standard based bus system. In different embodiments, the standard based bus system could be implemented in Peripheral Component Interconnect ("PCP"), Microchannel, Small Computer System Interface ("SCSI"), Industrial Standard Architecture ("ISA"), and Extended ISA ("EISA") architectures, for example. In addition, the functionality provided for in the components and modules of risk assessment system 100 may be combined into fewer components and modules or further separated into additional components and modules.

The risk assessment system 100 is generally controlled and coordinated by operating system software, such as Windows XP, Windows Vista, Windows 7, Windows 8, Windows Server, UNIX, Linux, SunOS, Solaris, iOS, Blackberry OS, or other compatible operating systems. In Macintosh systems, the operating system may be any available operating system, such as MAC OS X. In other embodiments, the risk assessment system 100 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary risk assessment system 100 may include one or more commonly available input/output (I/O) devices and interfaces 110, such as a keyboard, mouse, touchpad, and printer. In one embodiment, the I/O devices and interfaces 110 include one or more display devices, such as a monitor, that allows the visual presentation of data to a user. More particularly, a display device provides for the presentation of GUIs, application software data, and multimedia analytics, for example. The risk assessment system 100 may also include one or more multimedia devices 140, such as speakers, video cards, graphics accelerators, and microphones, for example.

The I/O devices and interfaces 110 provide a communication interface to various external devices such as, for example, he network 110 (FIGS. 1-2). The network 110 may comprise one or more of a LAN, WAN, and/or the Internet, for example, via a wired, wireless, or combination of wired and wireless, communication link. The network 110 communicates with various computing devices and/or other electronic devices via wired or wireless communication links.

Other Embodiments

Each of the processes, methods, and algorithms described in the preceding sections may be embodied in, and fully or partially automated by, code modules executed by one or more computer systems or computer processors comprising computer hardware. The code modules (or "engines") may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the risk assessment system 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other form; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A computerized method comprising:
   by a computing device having one or more computer processors and a non-transitory computer readable storage device storing software instruction for execution by the one or more computer processors, obtaining information describing network traffic between a plurality of network devices within a network;
   determining, based on the information describing network traffic, a network topology of the network, wherein the network topology comprises a plurality of nodes each connected by an edge to one or more of the plurality of nodes, and wherein each node is associated with one or more network devices;
   associating indications of user access rights of users to respective nodes included in the network topology; and
   generating user interface data associated with the network topology;
   wherein an indication of user access rights of a particular user to a particular node comprises one or more of:
   information indicating that the particular user is permitted access to a space which includes at least one network device associated with the particular node,
   information indicating that a user account associated with the particular user can provide information to, or receive information from, at least one network device associated with the particular node, or
   information indicating that the user account associated with the particular user is permitted to access, or has actually attempted to access, at least one network device associated with the particular node.

2. The computerized method of claim 1, further comprising:
   obtaining access control lists associated with respective nodes, wherein each access control list identifies user accounts permitted to access one or more network devices associated with a node.

3. The computerized method of claim 1, further comprising:
   obtaining access records associated with respective nodes, wherein each access record identifies actual access attempts by user accounts to one or more network devices associated with a node.

4. The computerized method of claim 1, wherein generating user interface data comprises generating a graph identifying the network topology.

5. The computerized method of claim 1, wherein each edge included in the network topology represents a communication path.

6. The computerized method of claim 1, further comprising:
   receiving an identifier of a particular user;
   obtaining indications of user access rights of the particular user that are associated with respective nodes included in the network topology; and
   including information in the user interface data identifying the indications of user access rights.

7. A system comprising:
   one or more computers and one or more storage devices storing instructions that are operable, when executed by the one or more computers, to cause the one or more computers to perform operations comprising:
   obtaining information describing network traffic between a plurality of network devices within a network;
   determining, based on the information describing network traffic, a network topology of the network, wherein the network topology comprises a plurality of nodes each connected by an edge to one or more of the plurality of nodes, and wherein each node is associated with one or more network devices; and
   associating indications of user access rights of users to respective nodes included in the network topology;

wherein an indication of user access rights of a particular user to a particular node comprises one or more of:

information indicating that the particular user is permitted access to a space which includes at least one network device associated with the particular node, information indicating that a user account associated with the particular user can provide information to, or receive information from, at least one network device associated with the particular node, or information indicating that the user account associated with the particular user is permitted to access, or has actually attempted to access, at least one network device associated with the particular node.

8. The system of claim 7, wherein the operations further comprise:

obtaining access control lists associated with respective nodes, wherein each access control list identifies user accounts permitted to access one or more network devices associated with a node.

9. The system of claim 7, wherein the operations further comprise: obtaining access records associated with respective nodes, wherein each access record identifies actual access attempts by user accounts to one or more network devices associated with a node.

10. The system of claim 7, wherein the operations further comprise:

generating user interface data associated with the network topology.

11. The system of claim 10, wherein the operations further comprise:

receiving an identifier of a particular user;

obtaining indications of user access rights of the particular user that are associated with respective nodes included in the network topology; and including information in the user interface data identifying the indications of user access rights.

12. The system of claim 10, wherein generating user interface data comprises generating a graph identifying the network topology.

13. The system of claim 7, wherein each edge included in the network topology represents a communication path.

14. A computer program product, encoded on one or more non-transitory computer storage media, comprising instructions that when executed by one or more computers cause the one or more computers to perform operations comprising:

obtaining information describing network traffic between a plurality of network devices within a network;

determining, based on the information describing network traffic, a network topology of the network, wherein the network topology comprises a plurality of nodes each connected by an edge to one or more of the plurality of nodes, and wherein each node is associated with one or more network devices;

associating indications of user access rights of users to respective nodes included in the network topology; and generating user interface data associated with the network topology;

wherein an indication of user access rights of a particular user to a particular node comprises one or more of:

information indicating that the particular user is permitted access to a space which includes at least one network device associated with the particular node, information indicating that a user account associated with the particular user can provide information to, or receive information from, at least one network device associated with the particular node, or information indicating that the user account associated with the particular user is permitted to access, or has actually attempted to access, at least one network device associated with the particular node.

15. The computer program product of claim 14, wherein the operations further comprise:

obtaining access control lists associated with respective nodes, wherein each access control list identifies user accounts permitted to access one or more network devices associated with a node.

16. The computer program product of claim 14, wherein the operations further comprise:

obtaining access records associated with respective nodes, wherein each access record identifies actual access attempts by user accounts to one or more network devices associated with a node.

17. The computer program product of claim 14, wherein the operations further comprise:

receiving an identifier of a particular user;

obtaining indications of user access rights of the particular user that are associated with respective nodes included in the network topology; and including information in the user interface data identifying the indications of user access rights.

* * * * *